US011468436B2

(12) United States Patent
Mayblum et al.

(10) Patent No.: US 11,468,436 B2
(45) Date of Patent: *Oct. 11, 2022

(54) SYSTEMS AND METHODS FOR FACILITATING TRANSACTIONS USING A DIGITAL CURRENCY

(71) Applicant: Ridgeview Digital LLC, Palm Beach Gardens, FL (US)

(72) Inventors: Jonathan Mayblum, Palm Beach Gardens, FL (US); Zachary Mayblum, Palm Beach Gardens, FL (US)

(73) Assignee: Ridgeview Digital LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,653

(22) Filed: Sep. 14, 2020

(65) Prior Publication Data

US 2020/0410482 A1    Dec. 31, 2020

Related U.S. Application Data

(63) Continuation of application No. 16/529,265, filed on Aug. 1, 2019, now Pat. No. 10,776,781.

(Continued)

(51) Int. Cl.
     *G06Q 20/36*      (2012.01)
     *G06Q 20/40*      (2012.01)

(52) U.S. Cl.
     CPC ..... *G06Q 20/3678* (2013.01); *G06Q 20/4016* (2013.01)

(58) Field of Classification Search
     CPC ........ G06Q 40/00; G06Q 40/02; G06Q 20/10; G06Q 20/102; G06Q 20/3678; G06Q 20/4016; G06Q 30/02; G06Q 30/06

(Continued)

(56) References Cited

U.S. PATENT DOCUMENTS 9,704,143 B2    7/2017   Walker et al.
10,540,652 B2 *   1/2020   Saur ...................... H04L 9/3247

(Continued)

FOREIGN PATENT DOCUMENTS

WO      2017213847 A1    12/2017

OTHER PUBLICATIONS

Zehr, D. (Mar. 9, 2014). With bitcoin, benefits outweigh drawbacks. Austin American Statesman Retrieved from https://dialog.proquest.com/professional/docview/1505369816?accountid=131444.*

(Continued)

*Primary Examiner* — Hani M Kazimi

(74) *Attorney, Agent, or Firm* — Perkins Coie LLP

(57) ABSTRACT

Systems and methods for facilitating a transaction between a first entity and a second entity using a digital currency are described. In some aspects, a computing node participates in a private distributed ledger for a financial institution and stores one or more transaction blocks representing transactions in a digital currency. The digital currency is issued by the financial institution and is fixed with respect to a fiat currency. The computing node is configured to receive a transaction for transferring an amount of digital currency from a first entity to a second entity, generate a new transaction block representing the transaction, transmit the new transaction block to other computing nodes participating in the private distributed ledger, receive an indication of validity of the new transaction block, and insert the new transaction block into the private distributed ledger.

28 Claims, 8 Drawing Sheets

Related U.S. Application Data

(60) Provisional application No. 62/752,174, filed on Oct. 29, 2018, provisional application No. 62/736,306, filed on Sep. 25, 2018, provisional application No. 62/713,374, filed on Aug. 1, 2018.

(58) Field of Classification Search
USPC .................................................. 705/39–45
See application file for complete search history.

(56) References Cited

U.S. PATENT DOCUMENTS

| | | | |
|---|---|---|---|
| 10,776,781 | B2 | 9/2020 | Mayblum et al. |
| 2013/0240622 | A1 | 9/2013 | Zhou et al. |
| 2015/0170112 | A1 | 6/2015 | DeCastro |
| 2015/0206106 | A1 | 7/2015 | Yago |
| 2016/0092988 | A1 | 3/2016 | Letourneau |
| 2016/0260169 | A1 | 9/2016 | Arnold et al. |
| 2016/0292680 | A1 | 10/2016 | Wilson, Jr. et al. |
| 2017/0004501 | A1 | 1/2017 | Ledford et al. |
| 2017/0048216 | A1 | 2/2017 | Chow et al. |
| 2017/0140378 | A1 | 5/2017 | Rao et al. |
| 2017/0177898 | A1 | 6/2017 | Dillenberger |
| 2017/0236104 | A1 | 8/2017 | Biton |
| 2017/0244757 | A1 | 8/2017 | Castinado et al. |
| 2017/0289111 | A1* | 10/2017 | Voell .................... H04L 63/045 |
| 2017/0301047 | A1 | 10/2017 | Brown et al. |
| 2017/0352116 | A1 | 12/2017 | Pierce et al. |
| 2018/0046992 | A1 | 2/2018 | Hanrahan et al. |
| 2018/0101848 | A1 | 4/2018 | Castagna et al. |
| 2018/0114205 | A1 | 4/2018 | Thomas et al. |
| 2018/0121911 | A1 | 5/2018 | Hallam et al. |
| 2018/0204190 | A1 | 7/2018 | Moy et al. |
| 2018/0268382 | A1 | 9/2018 | Wasserman |
| 2018/0293576 | A1 | 10/2018 | Song et al. |
| 2018/0365691 | A1 | 12/2018 | Sanders et al. |
| 2018/0374062 | A1 | 12/2018 | Hunter et al. |
| 2018/0375840 | A1 | 12/2018 | Moy et al. |
| 2019/0019144 | A1 | 1/2019 | Gillen |
| 2019/0019180 | A1* | 1/2019 | Coburn ................ G06Q 20/065 |
| 2019/0026730 | A1 | 1/2019 | Moy et al. |
| 2019/0081793 | A1 | 3/2019 | Martino et al. |
| 2019/0130483 | A1* | 5/2019 | de Jong ................ G06Q 20/40 |
| 2019/0172059 | A1 | 6/2019 | Castagna et al. |
| 2019/0188654 | A1 | 6/2019 | Albrecht |
| 2019/0220854 | A1 | 7/2019 | Pesci et al. |
| 2019/0236594 | A1 | 8/2019 | Ehrlich-Quinn |
| 2019/0259025 | A1 | 8/2019 | Hilton et al. |
| 2019/0303887 | A1 | 10/2019 | Wright et al. |
| 2019/0319968 | A1 | 10/2019 | Mehta |
| 2019/0327102 | A1 | 10/2019 | Ashwood-Smith et al. |
| 2019/0340607 | A1* | 11/2019 | Lynn .................. G06Q 20/3678 |
| 2019/0347725 | A1 | 11/2019 | de Jong |
| 2019/0385130 | A1 | 12/2019 | Mossoba et al. |
| 2019/0392437 | A1 | 12/2019 | Castagna et al. |
| 2020/0005264 | A1 | 1/2020 | Patterson et al. |
| 2020/0005403 | A1 | 1/2020 | Patterson et al. |
| 2020/0005404 | A1 | 1/2020 | Patterson et al. |
| 2020/0042996 | A1 | 2/2020 | Mayblum et al. |
| 2020/0042998 | A1* | 2/2020 | Mendhi ................ H04L 9/3239 |
| 2020/0134586 | A1* | 4/2020 | Wu ....................... G06Q 20/367 |
| 2020/0134616 | A1* | 4/2020 | Rafalko ............. G06Q 20/3278 |
| 2021/0051015 | A1 | 2/2021 | Widmann et al. |
| 2021/0319441 | A1* | 10/2021 | Knobel ................ G06Q 20/36 |

OTHER PUBLICATIONS

International Preliminary Report on Patentability dated Feb. 11, 2021 in connection with International Application No. PCT/US2019/044603.

Invitation to Pay Additional Fees mailed Sep. 16, 2019 in connection with International Application No. PCT/US2019/044603.

International Search Report and Written Opinion dated Nov. 29, 2019 in connection with International Application No. PCT/US2019/044603.

Crosby et al., BlockChain Technology: Beyond Bitcoin. Sutardja Center for Entrepreneurship & Technology Technical Report, Oct. 16, 2015, 35 pages.

Sakamoto, Bitcoin: A Peer-to-Peer Electronic Cash System. www.bitcoin.org, 2005, 9 pages.

Rennock et al., Blockchain Technology and Regulatory Investigations. The Journal. Litigation. Feb./Mar. 2018; 11 pages. Retrieved from the Internet: htms://www.steptoe.com/images/content/1/7/v3/171269/LIT-FebMar18-FeatureBlockchain.pdf Last accessed Dec. 12, 2019.

[No Author Listed], Frequently Asked Questions. ConsenSys Quorum. Retrieved from the Internet: https://consensys.net/quorum/faq. Last Accessed Dec. 16, 2020; 9 pages.

[No Author Listed], J.P. Morgan Creates Digital Coin for Payments. J.P.Morgan. Feb. 14, 2019; 6 pages. Retrieved from the Internet: https://www.jpmorgan.com/solutions/cib/news/digital-coin-payments. Last accessed Dec. 16, 2020.

Allison, Santander Settles Both Sides of a $20 Million Bond Trade on Ethereum. CoinDesk. Retrieved from the Internet: https://www.coindesk.com/santander-settles-both-sides-of-a-20-million-bond-trade-on-ethereum. Sep. 12, 2019; 7 pages. Last accessed Dec. 16, 2020.

Coppola, Using Blockchain in Banking to Improve FX Payment Efficiency. Blockchain for FX Transactions & Payment Netting. Amex US. Retrieved from the internet: https://www.americanexpress.com/us/foreign-exchange/articles/blockchain-in-banking-improve-payment-netting. Last accessed Dec. 16, 2020; 10 pages.

U.S. Appl. No. 17/020,523, filed Sep. 14, 2020, Mayblum et al.

PCT/US2019/044603, Sep. 16, 2019, Invitation to Pay Additional Fees.

PCT/US2019/044603, Nov. 29, 2019, International Search Report and Written Opinion.

Supplementary European Search Report and Opinion issued in corresponding European Patent Application No. 19844189.1 dated Feb. 21, 2022.

Communication pursuant to Rules 70(2) and 70a(2) EPC issued in corresponding European Patent Application No. 19844189.1 dated Mar. 11, 2022.

First Examination Report issued in corresponding Australian Patent Application No. 2019314448 dated Feb. 24, 2022.

Dominique, Guegan, "Public Blockchain versus Private Blockchain," May 18, 2017 (May 18, 2017), XP055890465, retrieved from the Internet: URL: https://halshs.archives-ouvertes.fr/halshs-01524440 on Feb. 11, 2022 (Abstract).

Dinh et al., "Blockbench: A Framework for Analyzing Private Blockchains," arxiv.org, Cornell University Library, 201 Olin Library Cornell University Ithaca, NY 14853, Mar. 12, 2017 (Mar. 12, 2017), XP080756367, DOI: 10.1145/3035918.3064033 (Abstract).

* cited by examiner

SYSTEMS AND METHODS FOR FACILITATING TRANSACTIONS USING A DIGITAL CURRENCY

CROSS REFERENCE TO RELATED APPLICATIONS

This Application is a Continuation of U.S. patent application Ser. No. 16/529,265, filed Aug. 1, 2019, entitled "SYSTEMS AND METHODS FOR FACILITATING TRANSACTIONS USING A DIGITAL CURRENCY," which claims the benefit under 35 U.S.C. § 119(e) of U.S. Provisional Patent Application Ser. No. 62/713,374, filed Aug. 1, 2018, and entitled "SYSTEMS AND METHODS FOR FACILITATING TRANSACTIONS USING A DIGITAL CURRENCY," U.S. Provisional Patent Application Ser. No. 62/736,306, filed Sep. 25, 2018, and entitled "SYSTEMS AND METHODS FOR FACILITATING TRANSACTIONS USING A DIGITAL CURRENCY," and U.S. Provisional Patent Application Ser. No. 62/752,174, filed Oct. 29, 2018, and entitled "SYSTEMS AND METHODS FOR FACILITATING TRANSACTIONS USING A DIGITAL CURRENCY," each of which are hereby incorporated herein by reference in their entirety.

BACKGROUND

Cryptocurrencies, such as Bitcoin, are growing in popularity every day. These cryptocurrencies rely on blockchain technology that facilitates financial transactions without need for a central authority, such as a central server. However, the lack of a central authority that monitors such transactions has led to various issues for cryptocurrency adopters, including prevalence of fraudulent transactions, widely fluctuating value of the cryptocurrency, and lack of transparency regarding the transactions using the cryptocurrency. Typical financial institutions have been hesitant to adopt cryptocurrencies due to at least some of these issues. In one instance, financial institution JP Morgan's Chairman and CEO, Jamie Dimon, has called the Bitcoin cryptocurrency a "fraud" and has said it "won't end well."

A cryptocurrency is a digital asset that can be used to perform financial transactions between two entities, such as a seller and a buyer. Financial transactions using the cryptocurrency are facilitated using a decentralized computing system that uses cryptography to secure the financial transactions. While the decentralized computing system may include multiple computing nodes, such as servers, computers, or other suitable computing nodes, the decentralized computing system does not have a central authority, such as a central server, that monitors financial transactions using the cryptocurrency. Instead, the computing nodes in the decentralized computing system use voting or another form of arriving at a consensus to approve or deny a certain financial transaction. Because cryptocurrencies have inherently low levels of regulation and are not governed by a central authority, the transactions cannot be closely monitored. These transactions do not require real names, so the involved parties can remain anonymous. However, this anonymity aspect of cryptocurrency can empower criminal activity. Cryptocurrencies have also become attractive to criminals thanks to their ability to easily carry millions of dollars' worth of cryptocurrency across international borders without detection.

In one instance, the decentralized computing system facilitates financial transactions using the cryptocurrency through a blockchain that serves as a database for financial transactions using the cryptocurrency. A blockchain is a continuously growing list of records, called blocks or transaction blocks, which are linked and secured using cryptography. Each new financial transaction may be added as a transaction block to the blockchain. For example, the block for a new financial transaction may include a cryptographic hash of the previous block, a time stamp, and transaction data. The cryptographic hash is used to generate a fixed-length mathematical representation of a variable amount of data, such as the previous block. For recording financial transactions, the blockchain is typically managed by the decentralized computing system, including the multiple computing nodes, to receive a new financial transaction, generate a new transaction block, validate the new transaction block, and insert the new transaction block into the blockhead. The new financial transaction is recorded in the transaction block typically in the form of "payer X sends Y cryptocurrency to payee Z." Once recorded, the data in any given transaction block cannot be altered retroactively without alteration of subsequent blocks, which requires consensus of the computing nodes in the decentralized computing system.

SUMMARY

The inventors have appreciated that current cryptocurrencies are consumer-focused. While the cryptocurrencies have been adopted by a number of consumers, they are not acceptable for use by typical financial institutions, such as banks and other government-regulated financial institutions. The financial institutions use fiat currency for facilitating financial transactions. A fiat currency, such as the United States Dollar, is currency that is declared by a government to be legal tender. Unlike cryptocurrencies, a fiat currency typically does not have wide fluctuations in value over short periods of time. The financial institutions, such as banks and other government-regulated financial institutions, use a centralized computing system including a central authority, such as the financial institution, to transparently monitor financial transactions and to receive, validate, and record the financial transactions. Such a centralized computing system may prevent fraudulent financial transactions, such as an authorized attempt by an entity to retrieve currency from one or more account holders at the financial institution. For example, the centralized computing system may require each attempted transaction to be authorized with a digital signature before the transaction is allowed to proceed. Because such transactions are regulated by the financial institution and/or the centralized computing system, the transactions may be closely monitored and require the involved parties to verify their identities for the transaction to occur. For example, the financial institution and/or the centralized computing system may require one or more of the involved parties to comply with "know your customer" (KYC) procedures to verify their identities and/or assess their suitability and potential risks of illegal activity. Such requirements will reduce illegal activity such as fraudulent transactions or money laundering.

In some aspects, systems and methods are described herein to facilitate financial transactions using a financial institution-specific digital currency that is fixed with respect to a fiat currency, such as the United States Dollar. The financial institution may implement a distributed ledger that is private to the financial institution. The private distributed ledger is a continuously growing list of records, called blocks or transaction blocks, which are linked and secured using cryptography. Unlike a public blockchain, the private distributed ledger is not publicly available for recording transactions. However, the financial institution and/or its agents may record new financial transactions by adding corresponding transaction blocks to the private distributed ledger. For example, the block for a new financial transaction may include a cryptographic hash of the previous block, a time stamp, and transaction data. The cryptographic hash is used to generate a fixed-length mathematical representation of a variable amount of data, such as the previous block. The private distributed ledger may record transactions among the financial institution's customers using the financial institution's digital currency. In some embodiments, other financial institutions may also participate in transactions using the financial institution's digital currency. For example, the other financial institution may send information regarding the transaction to the original financial institution for inclusion in the private distributed ledger. In another example, the other financial institution may be allowed access to the private distributed ledger. The other financial institution may partner with or be approved by the original financial institution and have privileges to record transactions in the private distributed ledger.

In some aspects, the financial institution is able to provide its customers with digital currency transactions while still being able to keep track of the value of the digital currency transactions in its profit-and-loss models. For example, the financial institution may apply its deposits in the digital currency towards its reserve requirement needed to comply with banking regulations. In the United States, the reserve requirement is part of a federal banking regulation that requires the financial institution to keep a minimum amount of its assets in cash, i.e., fiat currency. Because the financial institution's digital currency is backed by the corresponding fiat currency, such as the United States Dollar, the financial institution may rely on the digital currency as being equivalent to the corresponding fiat currency to meet its reserve requirement. In some embodiments, the financial institution may tie the digital currency to the fiat currency where the financial institution resides, where the customer resides, or another fiat currency suitable for this application.

An advantage of at least some embodiments is the provision of transaction transparency because only the financial institution and/or authorized agents, such as retailers, can approve transactions using the digital currency. Another advantage of at least some embodiments is the elimination of producing proof of work, which is typically needed for a public blockchain, such as the Bitcoin blockchain. Proof of work is an algorithm used in a public blockchain to confirm transactions and record new transaction blocks in the public blockchain. The proof of work algorithm is needed because any entity, individual, or organization can record new transaction blocks in the public blockchain. However, in the private distributed ledger for the financial institution's digital currency, only the financial institution and/or authorized agents can record transaction blocks in the private distributed ledger, thereby eliminating the need to verify the transaction blocks using the proof of work algorithm.

Another advantage of at least some embodiments is the provision of more security to the financial institution because the digital currency transactions can be stored in a private distributed ledger that is distributed across multiple servers, without need for a central transaction server. There is no longer a single point of failure in case the central transaction server were to be comprised. Another advantage of at least some embodiments is the provision of fast, low cost transactions from one customer to another customer of the financial institution. In some implementations, merchants may accept the financial institution's digital currency and have the confidence that it is backed by a fiat currency (e.g., the digital currency does not fluctuate in value relative to its assigned fiat currency) and be able to immediately use the funds (e.g., as compared to the delay and expense of credit cards and debit cards). Another advantage of at least some embodiments is that customers, such as merchants and individual consumers, may receive benefits associated with using a digital currency, such as fast speed and low cost of transactions, and banks may receive the benefits associated with a fiat currency, such as being able to include deposits in their profit-and-loss models.

In some embodiments, each customer of the financial institution is given a digital currency account. The digital currency may be fixed with respect to a fiat currency, such as the United States Dollar, and the digital currency may be exchangeable between the user's digital currency account and the user's fiat currency account. Customers may receive benefits of typical fiat currency accounts, such as a checking account, where they can earn interest and receive deposit protection under insurance from the Federal Deposit Insurance Corporation (FDIC). In some embodiments, customers may receive additional promotions, such as interest boosters, for using digital currency accounts. The financial institution issuing the digital currency may attract more deposits by offering such digital currency accounts.

In some embodiments, the customer of the financial institution can request that an amount of fiat currency be exchanged into the financial institution's digital currency. The financial institution may create a new digital currency account for the customer and deposit into the account an amount of digital currency equivalent to the amount of fiat currency. Alternatively, the financial institution may deposit into the customer's existing digital currency account an amount of digital currency equivalent to the amount of fiat currency. In some embodiments, the customer's digital currency account is separate from, but attached to, the customer's fiat currency account at the financial institution. The financial institution may receive or retrieve the fiat currency from the customer's fiat currency account at the financial institution or another financial institution or from the customer in the form of physical fiat currency or cash.

In some aspects, the financial institution's customers, including individual consumers and merchants, can use the digital currency without risks associated with cryptocurrencies, such as Bitcoin. For example, a merchant may not want to accept conventional digital currency due to the risk that the value may decrease in a short period of time. From the individual consumer perspective, it is a concern that many individuals view digital currencies as investments. The individual consumer may not want to pay with digital currency due to the risk that the value may increase (and in turn the individual consumer "overpaid" for the item). That is, while individual consumers typically view conventional digital currencies, such as Bitcoin, as investments rather than currency they can spend, merchants typically view conventional digital currencies as risky because their value can fluctuate widely. A digital currency whose value is pegged to a fiat currency may obviate both these issues. Therefore, another advantage of at least some embodiments is that individual consumers as well as merchants may receive benefits of digital currency while avoiding the above described issues associated with conventional digital currencies.

In some embodiments, a financial institution can choose to limit usage of its digital currency to customers of the financial institution and/or customers at other financial institutions that are approved by the financial institution. For transactions involving entities that are not approved by the financial institution, a conventional inter-bank transfer system, such as Automated Clearing House (ACH), may be used. ACH is an electronic network for fiat currency-based financial transactions in the United States. The use of the financial institution's digital currency may be beneficial even when used over the conventional inter-bank transfer system. Unlike conventional transactions involving credit and debit cards, transactions involving the digital currency may be completed immediately or within the same business day because of faster transaction speeds. In a conventional transaction involving a debit card, for example, the customer's account may be debited immediately but the merchant does not receive an immediate credit.

In some aspects, each financial institution may issue its own digital currency. The financial institutions may opt into a centralized clearing house for transactions involving digital currencies from two or more different financial institutions. Individual accounts may be debited and credited immediately and the financial institutions may settle inter-bank transactions once a day or at some other frequency. In an example, a store that keeps its funds in a particular bank's digital currency account can still accept digital currency issued from another bank. The transaction may be cleared through a centralized clearing house for a transaction that involving digital currencies from two different financial institutions.

Another advantage of at least some embodiments is to provide digital currency to consumers that provides the same safety as keeping funds in fiat currency at a typical financial institution. In the near term, federal governments are unlikely to issue digital currency. In the United States, by tying the value of the digital currency to the United States Dollar, the digital currency is backed by the corresponding fiat currency, the United States Dollar. Moreover, unlike cryptocurrency exchanges where cryptocurrency funds are typically held and/or traded, financial institutions are regulated by the federal government. Typical cryptocurrency exchanges are unregulated businesses that allow customers to trade cryptocurrencies for other assets, such as fiat currencies, or other cryptocurrencies. In some embodiments, consumers may receive deposit insurance with their digital currency accounts similar to deposit insurance offered with fiat currency accounts. In the United States, the Federal Deposit Insurance Corporation (FDIC) is an independent agency of the United States government that protects deposit consumers against the loss of their insured deposits if an FDIC-insured financial institution fails. Consumers may perform transactions in digital currency using mobile applications, web applications, or a physical digital currency card and receive the same fraud protection as transactions in a fiat currency.

In some embodiments, consumers can perform transactions using any means that can authenticate their identity, such as passwords, biometrics, facial recognition, fingerprints, eye scans, and other suitable authentication means. In some embodiments, consumers can use any suitable payment means, such as text messaging, near field communication-enabled devices, mobile payment services, such as APPLE PAY, VENMO, PAYPAL, and other suitable payment means (APPLE PAY is a registered mark of Apple Inc., Cupertino, Calif., USA; VENMO and PAYPAL are registered marks of Paypal, Inc., San Jose, Calif.).

Another advantage of at least some embodiments is that unlike typical cryptocurrencies where anybody can enter transactions into the blockchain and it is permanent, the financial institution can decide whether it is the only authorized entity or to add other authorized agents to record transactions in the private distributed ledger. In some embodiments, the financial institution may allow an authorized agent, such as another financial institution, access to the private distributed ledger. In some embodiments, the financial institution may allow an authorized agent to transmit transactions for insertion into the private distributed ledger but only the financial institution itself may record the transactions. Because the financial institution maintains control over who has access to the private distributed ledger and as such only the financial institution can approve such access, a heightened level of security may be provided to customers who use the financial institution's digital currency. In some embodiments, the financial institution may comply with a uniform set of rules required by a centralized clearing house, e.g., in order to handle transactions between different financial institutions involving respective digital currencies, as further described herein.

In some aspects, a system for facilitating a transaction between a first entity and a second entity using a digital currency comprises a computing node, wherein the computing node is connected to one or more computing nodes participating in a private distributed ledger for a financial institution, wherein the private distributed ledger stores one or more transaction blocks representing transactions in a digital currency that is issued by the financial institution and is fixed with respect to a fiat currency. The computing node is configured to store and maintain a copy of the private distributed ledger, receive a transaction for transferring an amount of digital currency from a first entity to a second entity, wherein the first entity and the second entity relate to the financial institution, generate a new transaction block representing the transaction for addition to the private distributed ledger, transmit the new transaction block to the one or more computing nodes participating in the private distributed ledger, receive, from the one or more computing nodes, an indication of validity of the new transaction block, and based on the indication of validity, insert the new transaction block into the private distributed ledger to complete the transaction for transferring the amount of digital currency from the first entity to the second entity.

In some embodiments, the transaction includes a digital signature of the first entity, wherein the indication of validity comprises an indication of validity of the digital signature of the first entity, wherein the computing node is further configured to receive, from the one or more computing nodes, an indication of invalidity of the new transaction block, wherein the indication of invalidity comprises an indication of invalidity of the digital signature of the first entity, and based on the indication of invalidity, deny the transaction and prevent insertion of the new transaction block into the private distributed ledger.

In some embodiments, the indication of validity comprises an indication of the first entity having a sufficient amount of digital currency required to complete the transaction, wherein the computing node is further configured to receive, from the one or more computing nodes, an indication of invalidity of the new transaction block, and based on the indication of invalidity comprising an indication of the first entity not having a sufficient amount of digital currency required to complete the transaction, determine that the first entity has access to an available amount of fiat currency equivalent to the sufficient amount of digital currency, exchange the available amount of fiat currency into the sufficient amount of digital currency required to complete the transaction, and retransmit the new transaction block to the one or more computing nodes participating in the private distributed ledger.

In some embodiments, the second entity receives the amount of digital currency or an amount of fiat currency equivalent to the amount of digital currency when the transaction is complete.

In some embodiments, the first entity is a consumer and the second entity is a merchant, and wherein the first entity and the second entity are customers of the financial institution.

In some embodiments, the transaction is initiated from a digital currency card, a mobile application or a web application configured for payment in the digital currency.

In some aspects, a system for facilitating a transaction between a first entity and a second entity using a digital currency comprises a computing node, wherein the computing node is connected to one or more computing nodes participating in a private distributed ledger for a first financial institution, wherein the private distributed ledger stores one or more transaction blocks representing transactions in a digital currency that is fixed with respect to a fiat currency. The computing node is configured to store and maintain a copy of the private distributed ledger, receive a transaction for transferring an amount of digital currency from a first entity to a second entity, wherein the first entity relates to the first financial institution and the second entity relates to a second financial institution, generate a new transaction block representing the transaction for addition to the private distributed ledger, transmit the new transaction block to the one or more computing nodes participating in the private distributed ledger, receive, from the one or more computing nodes, an indication of validity of the new transaction block, and based on the indication of validity, insert the new transaction block into the private distributed ledger to complete withdrawal of the amount of digital currency and exchange the amount of digital currency into an equivalent amount of fiat currency for transferring to the second entity relating to the second financial institution.

In some embodiments, the digital currency is associated with a digital wallet for one or more digital currencies from one or more financial institutions, comprising one or more pairs of public and private keys for a user holding one or more digital currencies from one or more of financial institutions, wherein each pair of public and private keys may be used by the user to receive and/or send a digital currency issued by a financial institution corresponding to the respective pair of public and private keys.

In some embodiments, no digital currency is stored in the digital wallet, and wherein a digital currency for a financial institution is stored and maintained in a private distributed ledger for the financial institution.

In some embodiments, in order to use a digital currency from the digital wallet, a user authorizes use of the corresponding private key for the digital currency to digitally sign a transaction involving the digital currency.

In some embodiments, the digital wallet includes software in the form of an application installed locally on a computer, a mobile phone, and/or a tablet.

In some embodiments, the digital wallet is connected via an application programming interface (API) to a trusted third party, and wherein the stored pairs of public and private keys are managed by the trusted third party.

In some embodiments, the digital wallet includes hardware for storing the pairs of public and private keys, wherein the hardware includes a button that a user is required to physically press or touch in order to digitally sign a transaction, and wherein the hardware requires that a user enter a personal identification number (PIN) before the user can digitally sign a transaction.

In some embodiments, the digital wallet provides a user with consumer rewards, loyalty points, and/or geo-location rewards for using the digital wallet, and wherein reward levels for a user are determined based on a balance of digital currency maintained in the digital wallet and/or meeting one or more transaction thresholds.

In some aspects, a method for exchanging a first digital currency that is fixed with respect to a first fiat currency into a second digital currency that is fixed with respect to a second fiat currency comprises receiving, from a user, at a financial institution, a request to exchange an amount of a first digital currency that is fixed with respect to a first fiat currency into an equivalent amount of a second digital currency that is fixed with respect to a second fiat currency, storing the received request for currency exchange in a private distributed ledger for the financial institution, and transferring out the amount of the first digital currency from a digital wallet for the user and transferring in the equivalent amount of the second digital currency to the digital wallet for the user.

In some embodiments, in order to complete the received request for currency exchange, the financial institution transfers out a corresponding amount of the first fiat currency from a first omnibus account for the first fiat currency and transfers in a corresponding equivalent amount of the second fiat currency to a second omnibus account for the second fiat currency.

In some embodiments, the received request for currency exchange is performed in real-time, and wherein a current currency exchange rate is applied to the request.

In some embodiments, the user of the digital wallet may set one or more notifications relating to an exchange rate between the first fiat currency and the second fiat currency, and the request for currency exchange is initiated based on receipt of the one or more notifications.

In some aspects, a clearing house for facilitating digital currency transactions comprises a computing node, wherein the computing node is connected to one or more computing nodes participating in a private distributed ledger for the clearing house, wherein the private distributed ledger stores one or more transaction blocks representing transactions in one or more digital currencies. The computing node is configured to store and maintain a copy of the private distributed ledger, receive a transaction for transferring an amount of digital currency from a first digital wallet to a second digital wallet, wherein the digital currency is issued by a first financial institution and is fixed with respect to a fiat currency, wherein the first digital wallet belongs to a user of the first financial institution and the second digital wallet belongs to a user of a second financial institution, and wherein information regarding the transaction is sent to or received from, the first digital wallet at the first financial institution and/or the second digital wallet at the second financial institution, to be recorded on a private distributed ledger for the first financial institution and/or a private distributed ledger for the second financial institution, store a new transaction block representing the transaction in the private distributed ledger for the clearing house, and update the first digital wallet and the second digital wallet, thereby transferring the amount of digital currency from the first digital wallet to the second digital wallet.

In some embodiments, the clearing house is notified by the first financial institution and/or the second financial institution regarding the transaction for transferring the amount of digital currency from the first digital wallet to the second digital wallet.

In some embodiments, the clearing house is notified by the first financial institution regarding another transaction for transferring an amount of digital currency from the first digital wallet to another digital wallet, both digital wallets belonging to users of the first financial institution.

In some embodiments, the clearing house is notified by the second financial institution regarding another transaction for transferring an amount of digital currency from the second digital wallet to another digital wallet, both digital wallets belonging to users of the second financial institution.

In some embodiments, the clearing house incorporates a tiered structure for ranking financial institutions based on asset size, debt rating, and/or financial solvency tests for each financial institution.

In some embodiments, the first financial institution and the second financial institution belong to a highest tier and settle transactions between them periodically or if a balance limit is exceeded, and wherein the first financial institution belongs to a highest tier and the second financial institution belong to a lowest tier and settle transactions between them on an individual transaction basis or when a balance limit is exceeded.

In some embodiments, the clearing house stores a unique transaction number to track the transaction across the private distributed ledgers for the clearing house and the first and second financial institutions, and wherein the unique transaction number is assigned by the clearing house, the first financial institution, the second financial institution, or an independent entity for issuing unique transaction numbers.

In some embodiments, the clearing house is the authority for disputes regarding transactions between the first and second financial institutions.

In some embodiments, the clearing house charges fees for facilitating transactions between the first entity relating to the first financial institution and the second entity relating to the second financial institution, and wherein the clearing house does not hold any digital currency.

In some embodiments, the clearing house charges fees for facilitating transactions between the first entity relating to the first financial institution and a third entity relating to the first financial institution.

In some embodiments, the clearing house notifies the first financial institution and the second financial institution regarding appropriate timing for completing the transaction.

In some embodiments, the clearing house implements one or more "know your customer" policies to standardize a process for issuing digital wallets to users and/or approving third parties to be entrusted with holding digital currencies for users.

In some embodiments, on receiving, directly or from the first financial institution or the second financial institution, information regarding the transaction being fraudulent, being used to purchase illicit goods, and/or illegal in nature, the clearing house blocks the transaction based on the information, and wherein the clearing house freezes and/or revokes the first digital wallet and/or the second digital wallet involved in the transaction to prevent further illegal activity and/or cause for forfeiture of funds.

In some aspects, a method for exchanging a digital currency that is fixed with respect to a fiat currency into a digitized asset representative of a commodity comprises receiving, from a user, at a financial institution, a request to exchange an amount of a digital currency that is fixed with respect to a fiat currency into an equivalent portion of a digitized asset representative of a commodity; storing the received request for commodity exchange in a private distributed ledger for the financial institution, and transferring out the amount of the digital currency from a digital wallet for the user and transferring in the equivalent portion of the digitized asset representative of the commodity to the digital wallet for the user.

In some embodiments, the commodity includes gold, silver, platinum, copper, oil, natural gas, corn, soybeans, wheat, cocoa, coffee, cotton, or sugar.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

DETAILED DESCRIPTION

Figure 1:
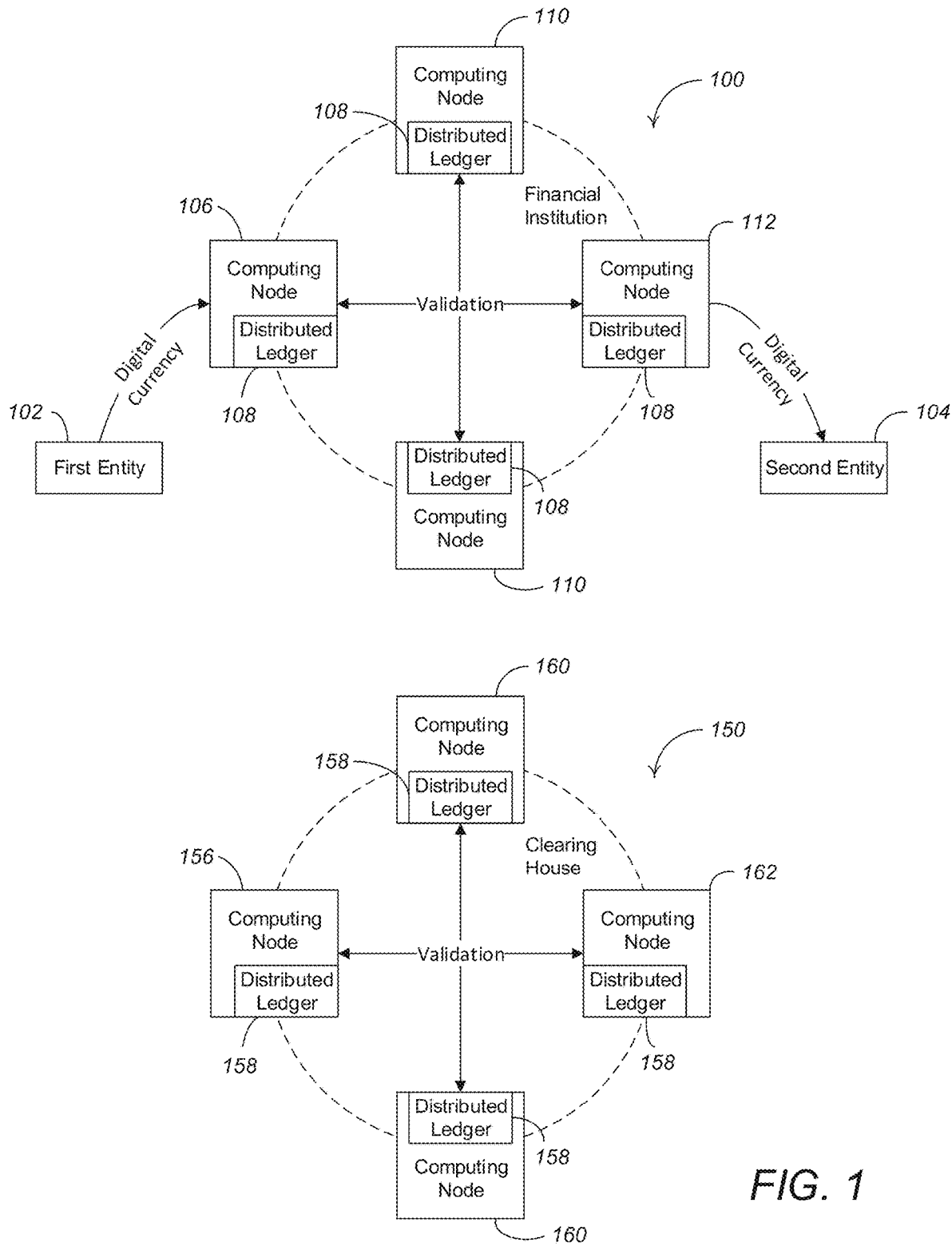
FIG. 1 shows block diagrams of illustrative systems for facilitating transactions using a digital currency in accordance with some embodiments of the technology described herein.

In some aspects, systems and methods are described herein to facilitate financial transactions using a financial institution-specific digital currency that is fixed with respect to a fiat currency, such as the United States Dollar. The financial institution may implement a distributed ledger that is private to the financial institution. The private distributed ledger is a continuously growing list of records, called blocks or transaction blocks, which are linked and secured using cryptography. Each new financial transaction may be added as a transaction block to the distributed ledger. For example, the block for a new financial transaction may include a cryptographic hash of the previous block, a time stamp, and transaction data. The cryptographic hash is used to generate a fixed-length mathematical representation of a variable amount of data, such as the previous block. The private distributed ledger may record transactions among the financial institution's customers using the financial institution's digital currency.

In some aspects, a purchase transaction is facilitated between two entities, a customer and a store, relating to the same financial institution, such as a bank. The bank may issue a digital currency card for transaction in the bank's digital currency. The bank's customer may visit a store that also keeps funds with the bank. The customer may provide the bank's digital currency card to pay for an item using the bank's digital currency. In some embodiments, the bank provides a device that can accept the bank's digital currency card and notify a server at the bank to complete the transaction (e.g., by recording the transaction in the private distributed ledger). In some embodiments, a machine provided by VISA, MASTERCARD, AMEX, SQUARE, or another payment company, can accept the digital currency card (VISA, MASTERCARD, AMEX, and SQUARE are registered marks of, respectively, Visa Inc., Foster City, Calif., USA; Mastercard Incorporated, Purchase, N.Y., USA; American Express Company, New York, N.Y., USA; and Square, Inc., San Francisco, Calif.). The machine may relay information regarding the transaction to the payment company's processing center, which in turn notifies the bank. Subsequently, a server at the bank may complete the transaction (e.g., by recording the transaction in the private distributed ledger). In some embodiments, a centralized clearing house may record the transaction in a private distributed ledger for the clearing house. In some embodiments, the transaction may be recorded in the financial institution's private distributed ledger and subsequently relayed for recordation in the clearing house's private distributed ledger. In some embodiments, the transaction may be simultaneously recorded in the financial institution's private distributed ledger and the clearing house's private distributed ledger. In some embodiments, the transaction may be recorded in the clearing house's private distributed ledger and, once approved by the clearing house, recorded in the financial institution's private distributed ledger.

In some embodiments, the digital currency is transferred from the customer's digital currency account to the store's digital currency account. If the store wishes to complete the transaction in a fiat currency, the bank may exchange the received digital currency into fiat currency, such as the United States Dollar, and deposit the fiat currency into the store's fiat currency account at the bank.

In some aspects, a funds transfer transaction is facilitated between two entities, e.g., two customers, relating to the same financial institution, such as a bank. For example, a customer of the bank may request a digital transfer of an amount of digital currency to another customer of the same bank. In some embodiments, the financial institution has a private distributed ledger stored across multiple computing nodes. The private distributed ledger stores one or more transaction blocks representing transactions in the digital currency that is issued by the financial institution and is fixed with respect to a fiat currency. A computing node receives a transaction for transferring an amount of digital currency from a first customer to a second customer of the financial institution. The computing node generates a new transaction block representing the transaction for addition to the private distributed ledger. The computing node transmits the new transaction block to the one or more computing nodes participating in the private distributed ledger. The computing node receives an indication of validity of the new transaction block. If the indication is valid, the computing node inserts the new transaction block into the private distributed ledger to complete the transaction.

FIG. 1 shows a block diagram of an illustrative system 100 for facilitating transactions using a digital currency between a first entity 102 and a second entity 104 relating to the same financial institution in accordance with some embodiments of the technology described herein. A computing node 106 is connected to other computing nodes 110, 112. The computing nodes 106, 110, 112 store and maintain a copy of a private distributed ledger 108 for a financial institution, such as a bank. The private distributed ledger 108 stores one or more transaction blocks representing transactions in a digital currency. In some embodiments, the digital currency is issued by the financial institution. In some embodiments, the digital currency is fixed with respect to a fiat currency.

The computing node 106 may receive a transaction for transferring an amount of digital currency from the first entity 102 to the second entity 104. For example, the first entity and the second entity may be customers relating to the same financial institution. The first entity may request a transfer of the amount of digital currency from the first entity's digital currency account at the financial institution. The computing node 106 may generate a new transaction block representing the transaction for addition to the private distributed ledger. The computing node 106 may transmit the new transaction block to the computing nodes 110, 112 participating in the private distributed ledger. The computing node 106 may receive an indication of validity of the new transaction block from one or more of computing nodes 110, 112. Based on the indication of validity, the computing node 106 may insert the new transaction block into the private distributed ledger. The computing node 106, the computing node 112, or another suitable computing node may complete the transaction by transferring the amount of digital currency from to the second entity. For example, the digital currency may be transferred to the second entity's digital currency account at the financial institution. In some embodiments, one or more financial institutions may opt into a centralized clearing house. The clearing house may implement its own private distributed ledger for recording all transactions including in digital currencies from one or more financial institutions. The transactions may be recorded in the private distributed ledger of each financial institution involved in the transaction and the private distributed ledger of the clearing house. For example, the private distributed ledger of the clearing house may include transactions between users from different financial institutions (including transactions between users of the same financial institution), but the private distributed ledger of each financial institution may only include transactions between users of the same financial institution or transactions involving a user of the financial institution as a party to the transaction. The clearing house may implemented using computing nodes (e.g., computing nodes 156, 160 and/or 162 (FIG. 1, illustrative system 150) or other suitable computing nodes) that store and maintain a copy of a private distributed ledger 158 for the clearing house. More details on the clearing house are provided further below.

In some aspects, a purchase transaction is facilitated between two entities, a customer and a store, relating to different financial institutions. A financial institution, such as a bank, may issue a digital currency card for transactions in the bank's digital currency. The bank's customer may visit a store that keeps funds with a different bank. The bank's customer may provide the digital currency card to pay for an item using the bank's digital currency. In some embodiments, the bank provides a digital wallet as described herein, e.g., with respect to FIGS. 6 and 7. The bank's customer may use the digital wallet to pay for an item using the bank's digital currency. In some embodiments, the bank provides a device that can accept the bank's digital currency card and/or digital wallet and notify a server at the bank to complete the transaction (e.g., by recording the transaction in the private distributed ledger and transmitting payment to the store's account at the other bank). In some embodiments, a machine provided by VISA, MASTERCARD, AMEX, SQUARE, or another payment company, can accept the digital currency card (VISA, MASTERCARD, AMEX, and SQUARE are registered marks of, respectively, Visa Inc., Foster City, Calif., USA; Mastercard Incorporated, Purchase, N.Y., USA; American Express Company, New York, N.Y., USA; and Square, Inc., San Francisco, Calif.). The machine may relay information regarding the transaction to the payment company's processing center, which in turn notifies the bank. Subsequently, a server at the bank may complete the transaction (e.g., by recording the transaction in the private distributed ledger and transmitting payment to the store's account at the other bank).

In some embodiments, the digital currency is exchanged for fiat currency, such as the United States Dollar, which is then transferred to the store's account at the other bank. In some embodiments, if the store wishes to complete the transaction in a digital currency, the store's bank may exchange the received fiat currency into the other bank's digital currency and deposit it into the store's digital currency account. In some implementations, the digital currency received in the store's digital currency account is different from the digital currency transferred from the customer's digital currency account. This is because the digital currencies issued by the two banks may be different and not interchangeable. For example, in some implementations, each financial institution may keep its own private distributed ledger for recording transactions in its own digital currency. However, transfers from one digital currency account at a bank to another digital currency at a different bank may be accomplished via an intermediary conversion to a fiat currency, such as the United States Dollar.

In some aspects, a funds transfer transaction is facilitated between two entities, e.g., two customers, relating to different financial institutions. For example, a customer of a financial institution may initiate a transaction for transferring digital currency to a customer of a different financial institution. In some embodiments, the digital currency transaction is recorded as a withdrawal and exchanged into a fiat currency for delivery to the second customer. In some embodiments, the financial institution has a private distributed ledger stored across multiple computing nodes. The private distributed ledger stores one or more transaction blocks representing transactions in the digital currency that is issued by the financial institution and is fixed with respect to a fiat currency. A computing node receives a transaction for transferring an amount of digital currency from a first customer of the financial institution to a second customer of a different financial institution. The computing node generates a new transaction block representing the transaction for addition to the private distributed ledger. The computing node transmits the new transaction block to the one or more computing nodes participating in the private distributed ledger. The computing node receives an indication of validity of the new transaction block. If the indication is valid, the computing node inserts the new transaction block into the private distributed ledger to complete withdrawal of the amount of digital currency. The computing node exchanges the amount of digital currency into an equivalent amount of fiat currency for transferring to the second customer.

Figure 2:
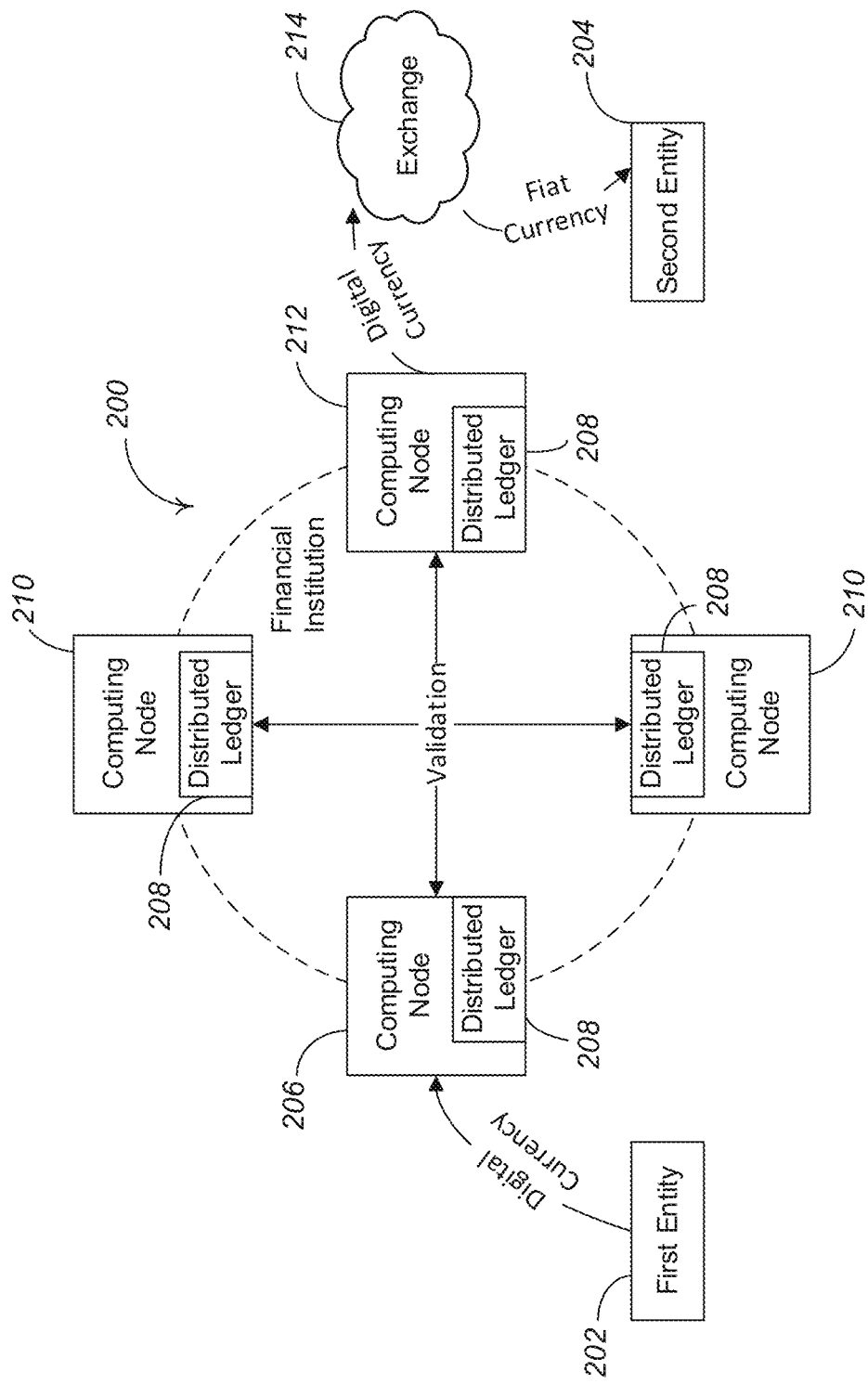
FIG. 2 is another block diagram of an illustrative system for facilitating transactions using a digital currency in accordance with some embodiments of the technology described herein.

FIG. 2 is another block diagram of an illustrative system 200 for facilitating transactions using a digital currency between a first entity 202 and a second entity 204 relating to different financial institutions in accordance with some embodiments of the technology described herein. A computing node 206 is connected to other computing nodes 210, 212. The computing nodes 206, 210, 212 store and maintain a copy of a private distributed ledger 208 for a financial institution, such as a bank. The private distributed ledger 108 stores one or more transaction blocks representing transactions in a digital currency. In some embodiments, the digital currency is issued by one of the financial institution. The financial institution issuing the digital currency may partner with the other financial institution and provide the other financial institution with access to the private distributed ledger. Alternatively or additionally, the financial institution issuing the digital currency may limit outside access to the private distributed ledger and complete the transaction using a centralized clearing house described herein or a conventional inter-bank transfer system, such as Automated Clearing House (ACH). ACH is an electronic network for fiat currency-based financial transactions in the United States. In some embodiments, the digital currency is fixed with respect to a fiat currency.

The computing node 206 may receive a transaction for transferring an amount of digital currency from the first entity 202 to the second entity 204. For example, the first entity and the second entity may be customers relating to different financial institutions. The first entity may request a transfer of the amount of digital currency from the first entity's digital currency account at the financial institution. The computing node 206 may generate a new transaction block representing the transaction for addition to the private distributed ledger. The computing node 206 may transmit the new transaction block to the computing nodes 210, 212 participating in the private distributed ledger. The computing node 206 may receive an indication of validity of the new transaction block from one or more of computing nodes 210, 212. Based on the indication of validity, the computing node 206 may insert the new transaction block into the private distributed ledger. The computing node 206, the computing node 212, or another suitable computing node may complete withdrawal of the amount of digital currency from the first entity's digital currency account. The computing node 206, the computing node 212, or another suitable computing node may exchange the amount of digital currency into an equivalent amount of fiat currency for transferring to the second entity. The exchange may be requested from an exchange server 214 that is equipped to convert the digital currency into equivalent fiat currency.

Figure 3:
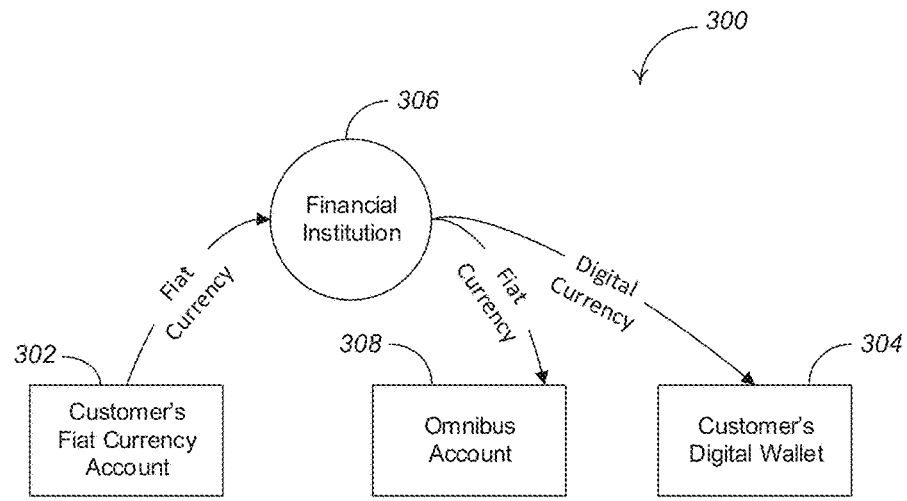
FIG. 3 shows illustrative diagrams of exemplary transactions using a digital currency in accordance with some embodiments of the technology described herein.
Figure 3:
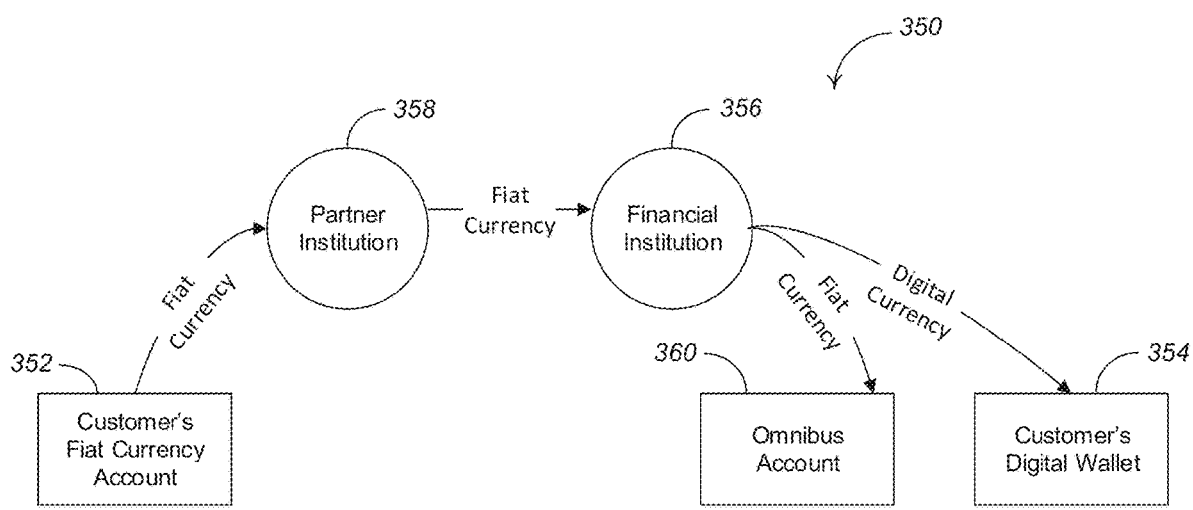

FIG. 3 shows illustrative diagrams of exemplary transactions 300 and 350 using a digital currency in accordance with some embodiments of the technology described herein. In some embodiments of exemplary transactions 300 and 350, the financial institution 306 or 356 issues the digital currency and is the only entity that can create the omnibus account 304 or 354 and/or deposit the digital currency into the omnibus account 304 or 354. In some embodiments, the financial institution may require a customer to comply with "know your customer" (KYC) procedures to verify their identities and/or assess their suitability and potential risks of illegal activity before creating an omnibus account for the customer. Such requirements will reduce illegal activity such as fraudulent transactions or money laundering. While the exemplary transactions 300 and 350 describe transactions for depositing digital currency into a digital wallet or another suitable digital currency account, the described techniques may be equally applicable to transactions for withdrawing digital currency from a digital wallet or another suitable digital currency account.

In transaction 300, a customer of the financial institution 306 requests an amount of fiat currency from his or her fiat currency account 302 be exchanged into the financial institution's digital currency. The financial institution 306 receives or retrieves the fiat currency from the customer's fiat currency account 302. The financial institution 306 may deposit the received amount of fiat currency into an omnibus account 308 (details for which are provided further below). The financial institution 306 may create a new digital wallet 304 for the customer and deposit into the account an amount of digital currency equivalent to the amount of fiat currency. Alternatively, the financial institution 306 may deposit into the customer's existing digital wallet 304 an amount of digital currency equivalent to the amount of fiat currency. In some embodiments, the customer's digital wallet 304 is separate from, but attached to, the customer's fiat currency account 302 at the financial institution 306.

In transaction 350, while the digital currency is issued by the financial institution 356, the financial institution 356 partners with another financial institution, such as partner institution 358, to provide the other financial institution with access to the financial institution's digital currency. A customer of the partner institution 358 requests an amount of fiat currency from his or her fiat currency account 352 be exchanged into the financial institution's digital currency. The financial institution 356 receives or retrieves the fiat currency from the customer's fiat currency account 352 at the partner institution 358. The financial institution 356 may deposit the received amount of fiat currency into an omnibus account 360 (details for which are provided further below). The financial institution 356 may create a new digital wallet 354 for the customer and deposit into the account an amount of digital currency equivalent to the amount of fiat currency. Alternatively, the financial institution 356 may deposit into the customer's existing digital wallet 354 an amount of digital currency equivalent to the amount of fiat currency. In some embodiments, the customer's digital wallet 354 is separate from, but attached to, the customer's fiat currency account 352 at the partner institution 358 and/or a fiat currency account at the financial institution 356. In some embodiments, the financial institution 356 completes the fiat currency transaction with partner institution 358 using a conventional inter-bank transfer system, such as Automated Clearing House (ACH). ACH is an electronic network for fiat currency-based financial transactions in the United States.

Figure 4:
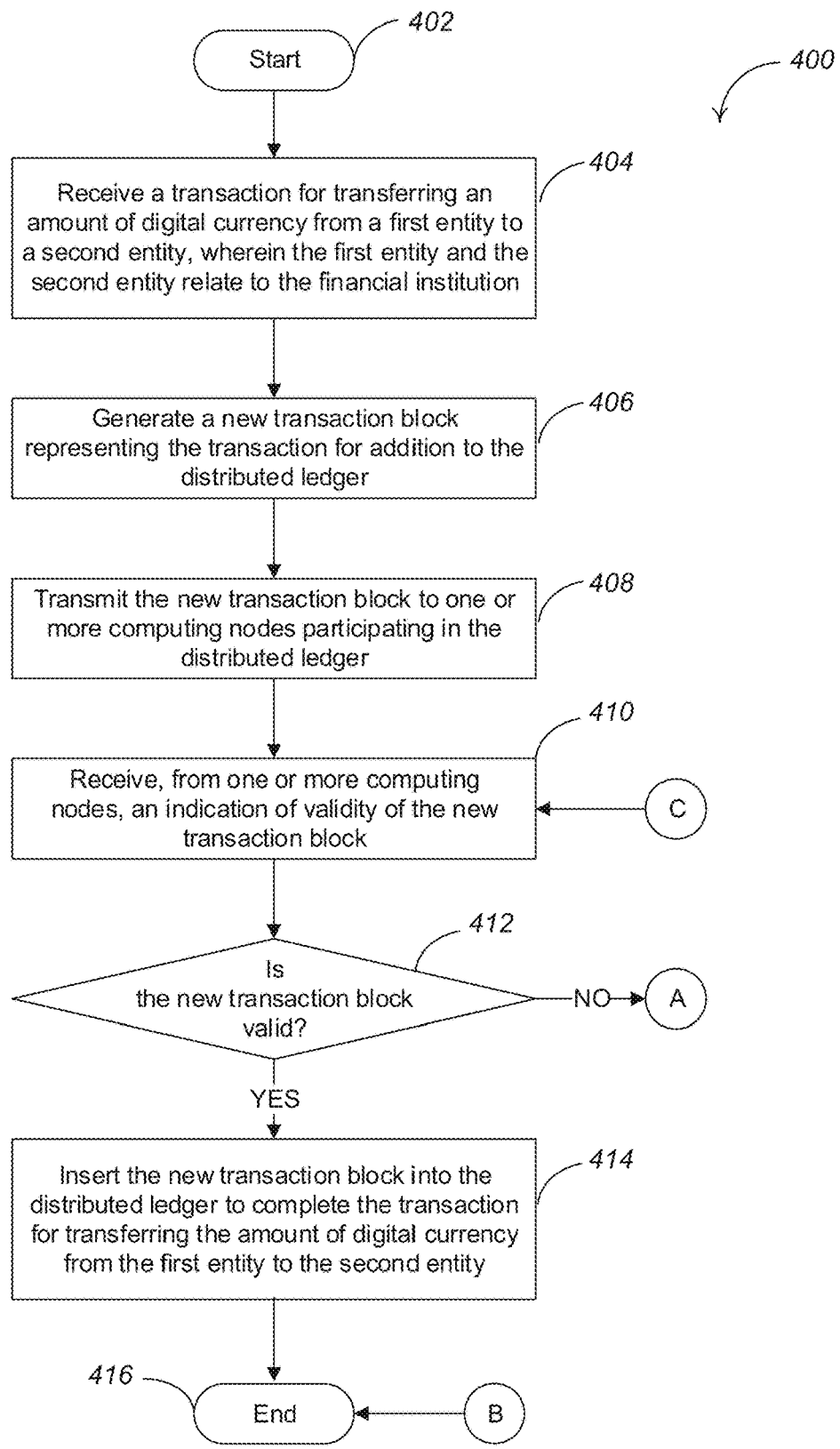
FIG. 4 is a diagram of an exemplary process for facilitating transactions using a digital currency in accordance with some embodiments of the technology described herein.

FIG. 4 is a diagram of an exemplary process 400 for facilitating transactions using a digital currency in accordance with some embodiments of the technology described herein. In some embodiments, the process is executed on a computing node connected to one or more computing nodes participating in a private distributed ledger for a financial institution. In some embodiments, the private distributed ledger stores one or more transaction blocks representing transactions in a digital currency. In some embodiments, the digital currency is issued by the financial institution. In some embodiments, the digital currency is fixed with respect to a fiat currency. In some embodiments, the computing node stores and maintains a copy of the private distributed ledger.

At act 402, the process starts.

At act 404, the computing node receives a transaction for transferring an amount of digital currency from a first entity to a second entity.

In some embodiments, the first entity and the second entity relate to the same financial institution. In some embodiments, the first entity relates to a financial institution and the second entity relates to another financial institution. In some embodiments, the first entity is a consumer and the second entity is a merchant. In some embodiments, the first entity and the second entity are customers of the same financial institution.

In some embodiments, the transaction is initiated from a digital currency card configured for payment in the digital currency. In some embodiments, the transaction is initiated from a mobile application or a web application configured for payment in the digital currency.

At act 406, the computing node generates a new transaction block representing the transaction for addition to the private distributed ledger.

At act 408, the computing node transmits the new transaction block to the one or more computing nodes participating in the private distributed ledger.

At act 410, the computing node receives, from the one or more computing nodes, an indication of validity of the new transaction block.

Figure 5:
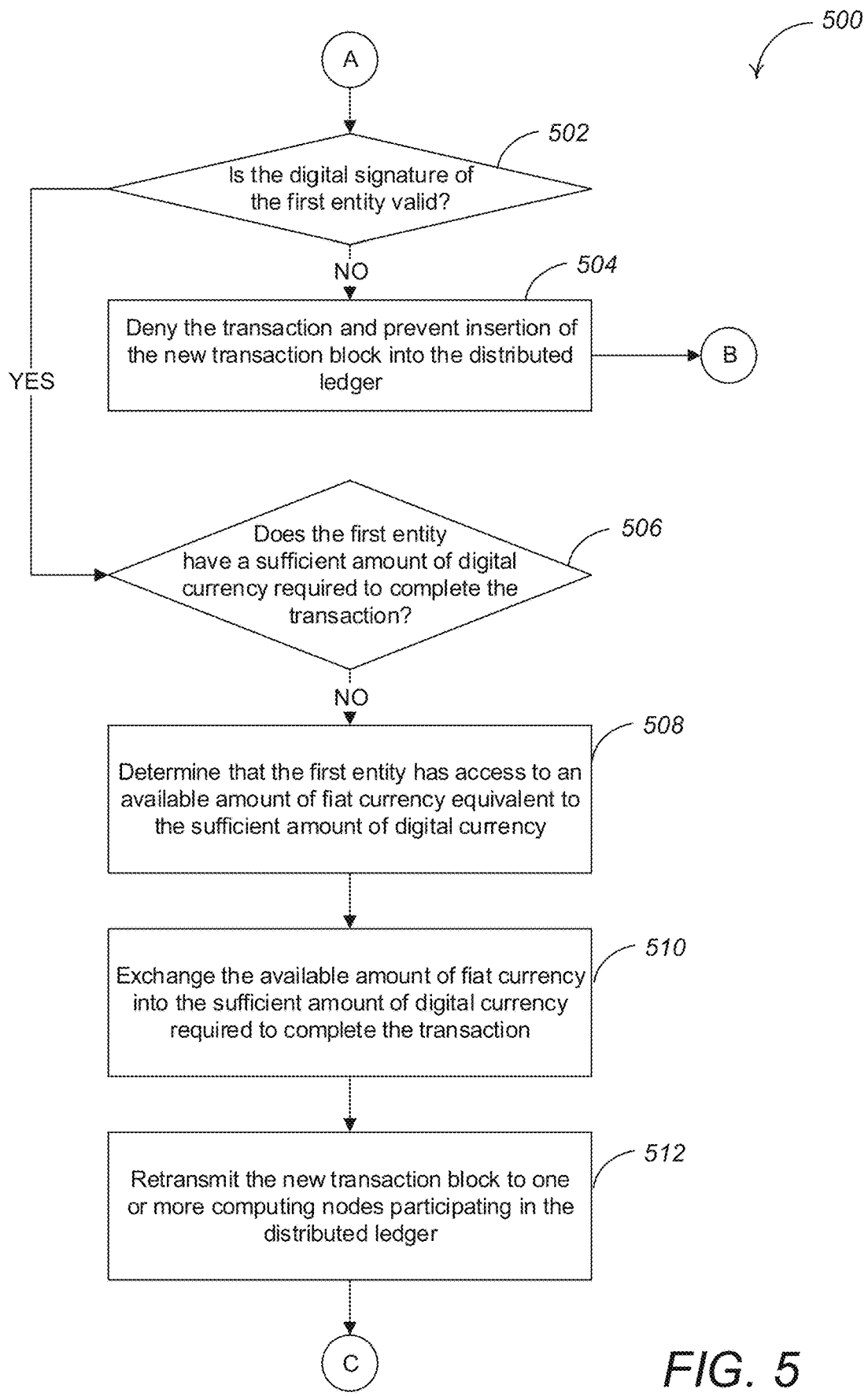
FIG. 5 is a diagram of an exemplary process that is executed when a transaction block is determined to be invalid in accordance with some embodiments of the technology described herein.

At act 412, the computing node determines whether the block is valid. FIG. 5 and related description provide further details on an exemplary process that is executed when a transaction block is determined to be invalid.

At act 414, based on the transaction block being determined to be valid, the computing node inserts the new transaction block into the private distributed ledger to complete the transaction for transferring the amount of digital currency from the first entity to the second entity.

In some embodiments, the second entity receives the amount of digital currency when the transaction is complete. In some embodiments, the second entity receives an amount of fiat currency equivalent to the amount of digital currency when the transaction is complete.

In some embodiments, at act 414, based on the transaction block being determined to be valid, the computing node insert the new transaction block into the private distributed ledger to complete withdrawal of the amount of digital currency from the first entity to the second entity, where the first entity and the second entity relate to different financial institutions. The computing node further exchanges the amount of digital currency into an equivalent amount of fiat currency for transferring to the second entity at the other financial institution.

At act 416, the process ends.

FIG. 5 is a diagram of an exemplary process 500 that is executed when a transaction block is determined to be invalid in accordance with some embodiments of the technology described herein. In some embodiments, the process is executed on a computing node connected to one or more computing nodes participating in a private distributed ledger for a financial institution. In some embodiments, the private distributed ledger stores one or more transaction blocks representing transactions in a digital currency that is issued by the financial institution and is fixed with respect to a fiat currency. In some embodiments, the computing node stores and maintains a copy of the private distributed ledger.

At act 502, the computing node determines whether a digital signature of the first entity is valid.

At act 504, based on the digital signature of the first entity being determined to be invalid, the computing node denies the transaction and prevents insertion of the new transaction block into the private distributed ledger.

At act 506, based on the digital signature of the first entity being determined to be valid, the computing node determines whether the first entity has a sufficient amount of digital currency required to complete the transaction.

At act 508, based on determining that the first entity does not have a sufficient amount of digital currency required to complete the transaction, the computing node determines that the first entity has access to an available amount of fiat currency equivalent to the sufficient amount of digital currency.

At act 510, the computing node exchanges the available amount of fiat currency into the sufficient amount of digital currency required to complete the transaction.

In some embodiments, the financial institution allows determination of availability of equivalent fiat currency and/or exchange of the equivalent fiat currency into digital currency based on permission from the first entity, e.g., a user of the financial institution. For example, the financial institution may request permission from the user at the time of the transaction. In another example, the financial institution may request permission from the user at a time prior to the transaction, such as when the user's omnibus account was opened or updated by the financial institution. In some embodiments, not all users of the financial institution may have access to this benefit of automatic determination and exchange of equivalent fiat currency into digital currency. The users who are allowed access may be determined based on the user's credit worthiness, length of relationship between the user and the financial institution, time averaged balances of the user's accounts, and/or other suitable metrics.

At act 512, the computing node retransmits the new transaction block to the one or more computing nodes participating in the private distributed ledger. In some embodiments, the computing node returns to act 410 of process 400 (FIG. 4) and continues to process the retransmitted transaction block.

In some aspects, while each financial institution may issue its own digital currency, the financial institutions may opt into a digital wallet that stores digital currencies from multiple financial institutions. For example, the digital wallet may store the respective public and private keys for digital currencies from one or more of the financial institutions. The public and private keys may be used to receive or send a digital currency issued by a respective institution. For example, in a purchase transaction, both the buyer and the seller may have respective digital wallets. The buyer and the seller may have received their respective digital wallets with their accounts at their preferred financial institutions. The buyer may use the private key for the digital currency issued by a particular institution to send an amount of the digital currency from the buyer's digital wallet to the seller's digital wallet.

In some embodiments, while the digital wallet may include multiple public and private key pairs for different digital currencies, none of the digital currencies themselves may be stored in the digital wallet. Instead, the digital currency for each financial institution may be stored and maintained in the respective financial institution's private distributed ledger. In order to use digital currency from his digital wallet, a user may authorize use of the corresponding private key to digitally sign a transaction and store a block for the transaction in the private distributed ledger, e.g., to spend the associated digital currency. In some embodiments, the digital wallet may include software in the form of an application installed locally on a computer, a mobile phone, a tablet, or another suitable user device. In some embodiments, the digital wallet may be connected via an application programming interface (API) to a trusted third party, such as GOOGLE, APPLE, VISA, MASTERCARD, AMEX, or another suitable entity (GOOGLE, APPLE, VISA, MASTERCARD, and AMEX are registered marks of, respectively, Google LLC, Mountain View, Calif., USA; and Apple Inc., Cupertino, Calif., USA; Visa Inc., Foster City, Calif., USA; Mastercard Incorporated, Purchase, N.Y., USA; and American Express Company, New York, N.Y., USA). The user's private keys may be managed by the trusted third party. In some embodiments, the digital wallet may include hardware for storing the user's private keys. The hardware may include a button that the user is required to physically press or touch in order to digitally sign a transaction. Alternatively or additionally, the hardware may require that the user enter a pin before the user can digitally sign a transaction.

In some embodiments, the digital wallet may provide a user with consumer rewards, loyalty points, or other suitable incentives for using the digital wallet. For example, the digital wallet may provide similar rewards as credit cards in the form of points, hotel stays, miles, cash back, or other suitable rewards. In some embodiments, financial institutions issuing digital currency may create unique relationships for accounts with their digital currency. For example, the financial institution may offer incentives directed to a hotel rewards program, an airline rewards program, or other suitable rewards programs. In some embodiments, reward levels for a user may be determined based on a balance of digital currency maintained in the user's digital wallet, meeting one or more transaction thresholds, or other suitable means. In some embodiments, the digital wallet may provide geo-location rewards to the user. For example, when the user enters a particular store, the digital wallet may offer a two-for-one sale on a product, if purchased from the store using the digital wallet.

Figure 6:
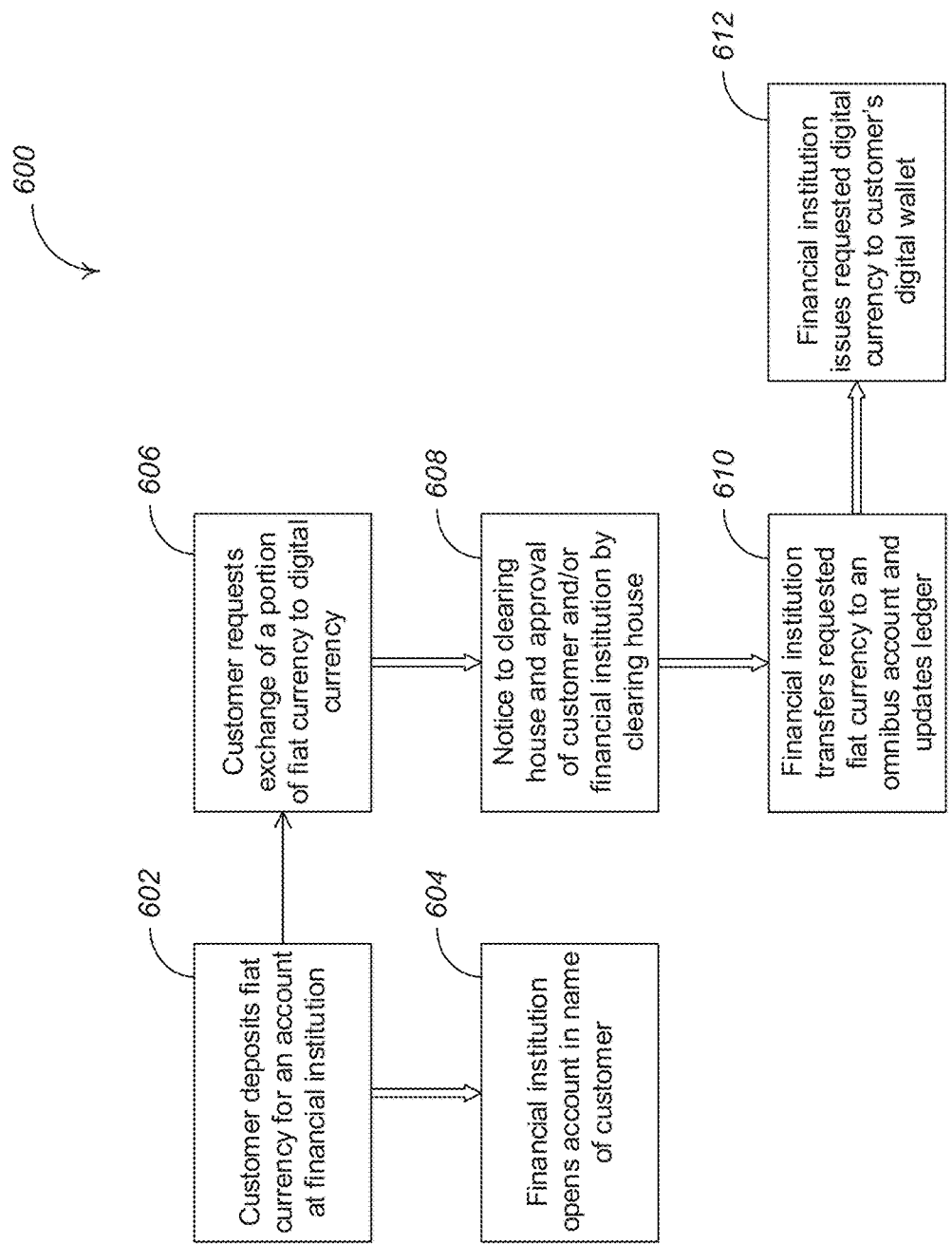
FIG. 6 is a diagram of an exemplary process for creating and/or populating a digital wallet using a digital currency in accordance with some embodiments of the technology described herein.

FIG. 6 is a diagram of an exemplary process for creating and/or populating a digital wallet using a digital currency in accordance with some embodiments of the technology described herein. At 602, a customer of a financial institution may deposit fiat currency, e.g., United States Dollar (USD), for an account at the financial institution.

At 604, the financial institution may open the account for the customer and deposit the customer's fiat currency into the account. In some embodiments, the financial institution may be pre-certified by the clearing house for opening accounts for some or all users of the financial institution. For example, a financial institution may be ranked based on rules from the clearing house that rate financial institutions. Based on a high rank for the financial institution, the financial institution may be allowed to open accounts for some or all users based on a uniform set of rules received from the clearing house. For example, the financial institution may be allowed to open accounts for users of the financial institution that are credit-worthy, have a threshold number of years of relationship with the financial institution, have a threshold amount of time-averaged balances across their accounts, and/or comply with other suitable metrics. Additionally or alternatively, the financial institution may be pre-certified by the clearing house for authorizing users and performing certain transactions for some or all users of the financial institution. Based on a high rank for the financial institution, the financial institution may be allowed to perform certain transactions for some or all users based on a uniform set of rules received from the clearing house.

At 606, the customer may request an exchange of a portion of his fiat currency, e.g., $100, into a digital currency issued by the financial institution, e.g., $AA100SC (i.e., digital currency issued by financial institution AA and fixed with respect to USD), where SC may refer to standard coin, stable coin, or another suitable reference to a digital currency that is fixed with respect to a fiat currency.

At 608, the financial institution may send a notice to a clearing house with information regarding the requested exchange from the customer and receive approval of the customer and/or the transaction by clearing house. For example, the clearing house may implement "know your customer" policies to standardize the process for issuing digital wallets to customers and/or approving third parties to be entrusted with holding digital currencies for customers. In some embodiments, the financial institution may be pre-certified by the clearing house for authorizing users and performing certain transactions for some or all users of the financial institution. Based on a high rank for the financial institution, the financial institution may be allowed to perform certain transactions for some or all users based on a uniform set of rules received from the clearing house. For example, the financial institution may be allowed to perform currency exchange transactions for most or all users, but may be allowed to perform commodity exchange transactions for only those users that are credit-worthy, have a threshold number of years of relationship with the financial institution, have a threshold amount of time-averaged balances across their accounts, and/or comply with other suitable metrics.

At 610, the financial institution may record the transaction on a private distributed ledger for the digital currency and transfer the fiat currency from the user's account to an omnibus account (details for which are provided further below).

At 612, the financial institution may issue the equivalent digital currency and transfer the digital currency to the user's digital wallet. In embodiments where a digital wallet does not exist for the user, the financial institution may request creation of the digital wallet prior to transferring the digital currency to the user's digital wallet.

In some embodiments, the digital wallet may hold a digital currency that is issued by a financial institution and fixed with respect to a fiat currency, e.g., United States Dollar (USD), and another digital currency that is issued by another financial institution and fixed with respect to the same fiat currency. For example, the digital wallet may include $AA100SC (i.e., digital currency issued by financial institution AA and fixed with respect to USD) and $BB100SC (i.e., digital currency issued by financial institution BB and fixed with respect to USD). The customer's digital wallet may hold multiple types of digital currencies from financial institutions that have opted into the digital wallet.

In some embodiments, the digital wallet may hold a digital currency that is fixed with respect to a fiat currency, e.g., United States Dollar (USD), and another digital currency that is fixed with respect to a different fiat currency, e.g., Euro (EUR). These digital currencies may be issued by the same financial institution or different financial institutions. For example, the digital wallet may include $AA100SC (i.e., digital currency issued by financial institution AA and fixed with respect to USD) and €AA100SC (i.e., digital currency issued by financial institution AA and fixed with respect to EUR). In another example, the digital wallet may include $AA100SC (i.e., digital currency issued by financial institution AA and fixed with respect to USD) and €BB100SC (i.e., digital currency issued by financial institution BB and fixed with respect to EUR).

In some embodiments, a user's digital wallet may include one or more rules, e.g., to implement a tiered or ranking system, for accepting and sending out digital currency. The rules may be received from one or more financial institutions, one or more users, a clearing house for processing digital currency transactions using the digital wallet (details for which are provided further below), or another authorized source. For example, the user's primary financial institution may be assigned "Tier 1-A" status, signifying that the user may prefer to accept and/or store digital currency issued by the user's primary financial institution. In another example, the tiered or ranking system may implemented based on rules received from a clearing house that rates financial institutions. The clearing house may include one or more financial institutions issuing digital currency and/or other entities suited to ranking such financial institutions. In some embodiments, the digital wallet may send out digital currency in reverse tier order. For example, if the user wishes to send digital currency equivalent to $100, the digital wallet may select, from the available digital currencies in the digital wallet, the digital currency issued by the lowest tier financial institution. In some embodiments, the user of the digital wallet may specify one or more financial institutions whose digital currencies the user may wish to accept and/or reject. Alternatively or additionally, the user may specify one or more financial institutions whose digital currencies that are acceptable but need to be converted to fiat currency on receipt.

In some embodiments, a user of the digital wallet may request conversion of digital currency in their digital wallet into fiat currency or another digital currency. In some embodiments, a user of the digital wallet may request a financial institution to exchange the financial institution's digital currency into fiat currency. For example, a customer of a financial institution may request that digital currency issued by the financial institution, e.g., $AA100SC, be converted into equivalent fiat currency, e.g., $100. The financial institution may record the transaction on its private distributed ledger and issue the equivalent fiat currency to the customer.

In some embodiments, a user of the digital wallet may request a financial institution to exchange another financial institution's digital currency into fiat currency. For example, a customer of a financial institution AA may request that digital currency issued by another financial institution BB, e.g., $BB100SC, be converted into equivalent fiat currency, e.g., $100. The financial institution AA may record the transaction on its private distributed ledger, send the transaction to a clearing house (details for which are provided further below), and/or send the transaction to the financial institution BB, in order to issue the equivalent fiat currency to the consumer. In some embodiments, based on the tier of the financial institution BB, the financial institution AA may issue the equivalent fiat currency to the customer from its own reserves (e.g., if the financial institution BB is high ranked) and receive the fiat currency from the financial institution BB when the two financial institutions settle their accounts on a periodic basis. Alternatively, the financial institution AA may wait for the fiat currency to be received from the financial institution BB before issuing the equivalent fiat currency to the customer (e.g., if the financial institution BB is low ranked).

In some embodiments, a financial institution receiving digital currency issued by another financial institution may apply a tiered or ranking system for determining appropriate timing for completing the transaction (e.g., Tier 1-Tier 5). For example, financial institutions in the highest tier, e.g., Tier 1, may settle all transactions between them once a month or when a certain limit is reached. In another example, a financial institution in the highest tier, e.g., Tier 1, entering a transaction with a financial institution in the lowest tier, e.g., Tier 5, may require the lowest tier financial institution to immediately complete the transaction and transfer the digital currency.

In some embodiments, a user of the digital wallet may request a financial institution to exchange the financial institution's digital currency that is fixed with respect to a fiat currency into digital currency that is fixed with respect to a different fiat currency. For example, the user may request the financial institution to exchange $AA100SC (i.e., digital currency issued by the financial institution and fixed with respect to USD) into €AA86.33SC (i.e., digital currency issued by the financial institution and fixed with respect to EUR, based on the current exchange rate). The financial institution may record the currency exchange on its private distributed ledger and transfer the requested digital currency to the user's digital wallet. In some embodiments, the financial institution may maintain an omnibus account for each fiat currency that supports a corresponding digital currency issued to all its customers. In order to complete the currency exchange transaction, the financial institution may transfer out an amount of fiat currency, e.g., USD, from the omnibus account for the fiat currency and transfer in an equivalent amount of the exchanged currency, e.g., EUR, to the omnibus account for the exchanged currency.

In some embodiments, the financial institution may maintain in the omnibus account an amount of fiat currency equivalent to an amount of digital currency issued thus far by the financial institution. The omnibus account may be used to back the issued digital currency. Deposit insurance may be available for such a fiat currency account. For example, in the United States, the Federal Deposit Insurance Corporation (FDIC) is an independent agency of the United States government that protects deposit consumers against the loss of their insured deposits if an FDIC-insured financial institution fails. The financial institution may track ownership of the issued digital currency and obtain insurance for the equivalent fiat currency for each account holder. In some embodiments, the digital wallet may include an indication of which country is insuring the financial institution relating to the digital currency in the digital wallet. For example, the digital wallet may include color and/or code indications regarding which country is insuring the financial institution relating to the digital currency in the digital wallet. In some embodiments, the omnibus account may be used to satisfy government regulations relating to currency exchange transactions (and, optionally, in addition to the KYC procedures described above). For example, in the United States, the Office of the Comptroller of the Currency (OCC) enforces regulations relating to currency exchange. Accordingly, the financial institution may maintain an omnibus account for each fiat currency that is used to back a digital currency issued by the financial institution, where ownership of the omnibus account is tied to each holder of digital currency.

In some embodiments, the user of the digital wallet may set one or more notifications relating to fiat currency exchange rates in order to decide a suitable time to execute the currency exchange transaction. For example, the user may be interested in exchanging a USD-backed digital currency into a EUR-backed digital currency. In another example, the user may be interested in exchanging a USD-backed digital currency into a commodity, such as gold, silver, platinum, copper, oil, natural gas, corn, soybeans, wheat, cocoa, coffee, cotton, sugar, or another suitable commodity. The commodity may be represented as a digitized asset, e.g., in the form of a token, that can be included in a digital transaction and/or stored in the user's digital wallet. For example, the digitized asset for the commodity may be stored in a separate area of the user's digital wallet. Because the value for the digitized asset can fluctuate based on the commodity's value, the user's digital wallet may indicate the current value, the value at the time of the transaction, and/or indicate to the user that the value of the digitized asset may fluctuate based on the commodity's value.

The user may set a notification for a favorable exchange rate and/or a range of favorable exchange rates. On receiving the notification, the user may initiate the currency exchange or commodity exchange transaction. Alternatively or additionally, the user may allow the digital wallet to automatically initiate the currency exchange or commodity exchange transaction on receipt of the notification. In some embodiments, the financial institution may regulate and approve or deny the ability for the user to receive and/or initiate currency exchange or commodity exchange transactions. For example, the financial institution may require the user to indicate whether the transaction(s) are related to personal use or investment purposes. The financial institution may take into account this information when approving or denying the ability for the user to receive and/or initiate currency exchange or commodity exchange transactions. In some embodiments, the financial institution may provide currency exchange or commodity exchange transaction facilities to all its customers. In some embodiments, the financial institution may provide currency exchange or commodity exchange transaction facilities to customers after approving each customer on an individual basis. In some embodiments, as a control mechanism, recipients of digital currency (e.g., retailers, business users, friends, etc.) may be required to receive only digital currency that is backed by the country of their financial institution. However, a recipient user may opt to accept payments in a digital currency backed by another fiat currency or a commodity, when allowed by their financial institution.

In some aspects, the financial institutions issuing their respective digital currencies may opt into a centralized clearing house. The clearing house may implement its own private distributed ledger for recording all transactions including in digital currencies from two different financial institutions. The transactions may be recorded in the private distributed ledger of each financial institution involved in the transaction and the private distributed ledger of the clearing house. For example, the private distributed ledger of the clearing house may include transactions between users from different financial institutions (including transactions between users of the same financial institution), but the private distributed ledger of each financial institution may only include transactions between users of the same financial institution or transactions involving a user of the financial institution as a party to the transaction. In some embodiments, the transaction may be recorded in the financial institution's private distributed ledger and subsequently relayed for recordation in the clearing house's private distributed ledger. In some embodiments, the transaction may be simultaneously recorded in the financial institution's private distributed ledger and the clearing house's private distributed ledger. In some embodiments, the transaction may be recorded in the clearing house's private distributed ledger and, once approved by the clearing house, recorded in the financial institution's private distributed ledger. In some embodiments, the clearing house, like the financial institutions' private distributed ledgers, may be implemented using computing nodes (e.g., computing nodes 156, 160 and/or 162 (FIG. 1, illustrative system 150)) that store and maintain a copy of a private distributed ledger 158 for the clearing house. The private distributed ledger may store one or more transaction blocks representing transactions in digital currencies and involving two or more different financial institutions. In an example, a store that keeps its funds in a particular bank's digital currency account can accept digital currency issued from another bank because the transaction may be cleared through the clearing house as a transaction that involves digital currencies from two different financial institutions.

In some embodiments, the clearing house may record a transaction between two financial institutions and notify the financial institutions regarding appropriate timing for completing the transaction. The clearing house may incorporate a tiered structure for ranking financial institutions based on asset size, debt rating, financial solvency tests and/or other suitable criteria for each financial institution. In some embodiments, there are two steps for completing the transaction, clearing and settlement. Clearing is the transfer and confirmation of information between the payer (sending financial institution) and payee (receiving financial institution). Settlement is the actual transfer of digital currency between the payer's financial institution and the payee's financial institution. Settlement discharges the obligation of the payer financial institution to the payee financial institution with respect to the transaction. For example, financial institutions in the highest tier may settle all transactions between them only once a month or if a balance limit is exceeded. In another example, a transaction between a financial institution in the highest tier and a financial institution in the lowest tier may settle on an individual transaction basis or when a balance limit is exceeded.

In some embodiments, each individual transaction may receive a unique transaction number that may be used to track the transaction across the private distributed ledgers for the clearing house and the involved financial institutions. For example, in a transaction involving transfer of digital currency from one financial institution to another, the transaction may be independently recorded in the private distributed ledger of each financial institution and the private distributed ledger of the clearing house. The independent recordations of the transactions may be tracked using the unique transaction number assigned to the transaction. The unique transaction number may be assigned by either financial institution, the clearing house, or another entity suitable for issuing such unique transaction numbers. In some embodiments, the clearing house may be the authority for disputes regarding transactions between financial institutions. To help resolve the dispute, the clearing house may retrieve the transaction from its private distributed ledger using the assigned unique transaction number.

In some embodiments, while the clearing house may charge fees for facilitating transactions between customers from different financial institutions and/or between customers within a financial institution, the clearing house itself may not hold any digital currency. The clearing house may instead notify the financial institutions regarding appropriate timing for completing the transaction. In some embodiments, the clearing house may implement "know your customer" policies to standardize the process for issuing digital wallets to customers and/or approving third parties to be entrusted with holding digital currencies for customers. In some embodiments, on instruction from one of the financial institutions involved in the transaction, the clearing house may block a certain transaction. For example, the financial institution may have received information regarding the transaction being fraudulent, being used to purchase illicit goods, or other illegal activity. Similarly, the clearing house itself may receive such information and block a certain transaction based on the information. In another example, the financial institution and/or the clearing house may freeze and/or revoke one or both digital wallets involved in the transaction to prevent further illegal activity and cause for forfeiture of funds.

Figure 7:
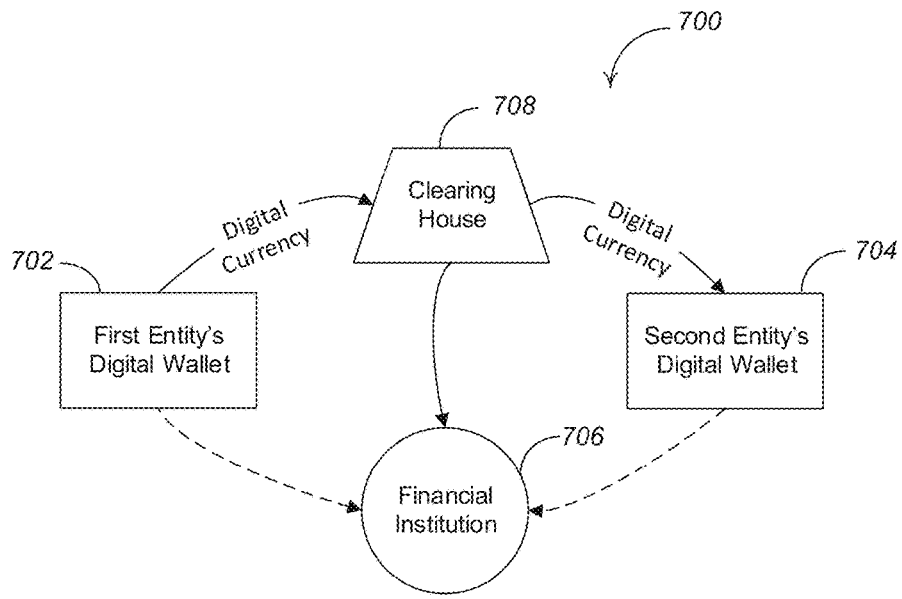
FIG. 7 shows illustrative diagrams of exemplary transactions in a digital currency using a digital wallet in accordance with some embodiments of the technology described herein.
Figure 7:
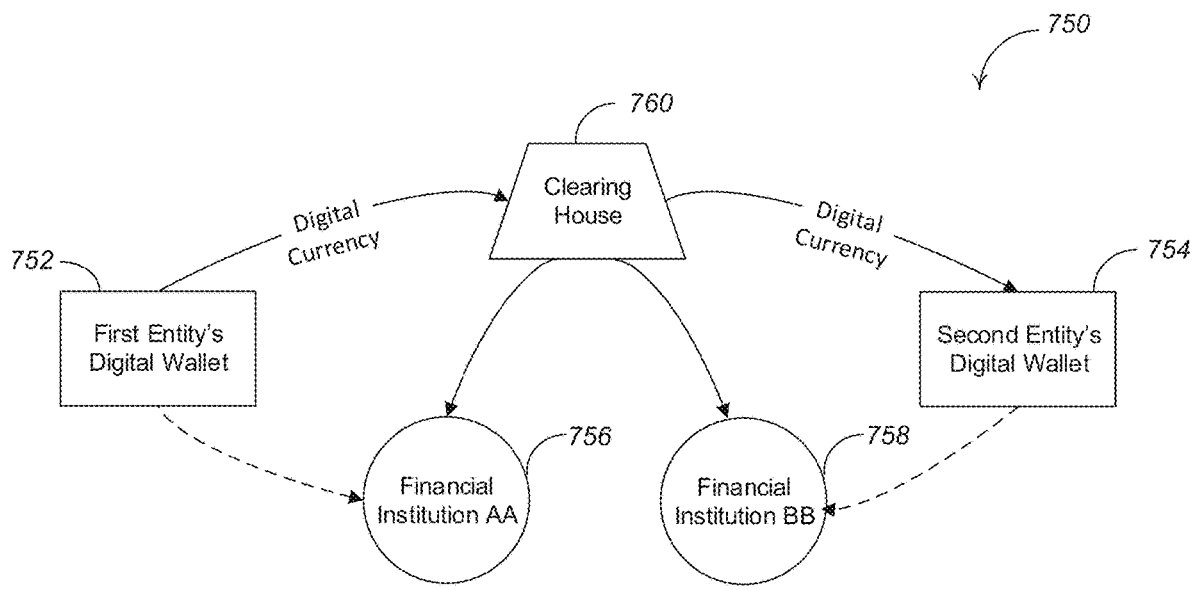

FIG. 7 shows illustrative diagrams of exemplary transactions 700 and 750 in a digital currency using a digital wallet in accordance with some embodiments of the technology described herein. In transaction 700, a customer of the financial institution 706 requests an amount of digital currency from his digital wallet 702, e.g., $AA100SC, be transferred to the digital wallet 704 for another customer of the financial institution 706. The transaction may be recorded on the private distributed ledger of the clearing house 708 and the digital wallets 702 and 704 may be updated and the digital currency, e.g., $AA100SC, may be transferred from the digital wallet 702 to the digital wallet 704. In some embodiments, the clearing house 708 may send the transaction to be recorded on the private distributed ledger for the financial institution 706. In some embodiments, one or both digital wallets 702, 704 may send the transaction to be recorded on the private distributed ledger for the financial institution 706. The financial institution may update the holder of the equivalent fiat currency in the financial institution's omnibus account. This may update the ownership information or other suitable information for protecting the new owner of the transferred digital currency with FDIC insurance or other suitable insurance based on region. In some embodiments, the clearing house 708 is notified by the financial institution 706 regarding the requested transaction to transfer digital currency from the digital wallet 702 to the digital wallet 704. In this case, the private distributed ledger for the clearing house 708 and/or the private distributed ledger for the financial institution 706 may be updated to reflect the transaction according to the techniques described herein. In some embodiments, for a transaction between digital wallets of two users at different financial institutions, one or both financial institutions may notify the clearing house 708 regarding the transaction. In this case, the private distributed ledger for the clearing house 708 and/or the private distributed ledgers for both financial institutions may be updated to reflect the transaction according to the techniques described herein.

In transaction 750, a customer of the financial institution 756 requests an amount of digital currency from his digital wallet 752, e.g., $AA100SC, be transferred to the digital wallet 754 for a customer of another financial institution 758. The transaction may be recorded on the private distributed ledger of the clearing house 760 and the digital wallets 752 and 754 may be updated and the digital currency, e.g., $AA100SC, may be transferred from the digital wallet 752 to the digital wallet 754. In some embodiments, because this transaction is across two financial institutions, the clearing house 760 acts as an intermediary between the two financial institutions. In some embodiments, the clearing house 760 may send the transaction to be recorded on the private distributed ledgers for the financial institutions 756, 758. In some embodiments, one or both digital wallets 752, 754 may send the transaction to be recorded on the private distributed ledgers for the financial institutions 756, 758. In some embodiments, the transaction may be recorded in a private distributed ledger in one or both digital wallets 752, 754. This step may serve as a safeguard for verifying the transaction, e.g., in absence of the clearing house 760. In some embodiments, the clearing house 760 may record the transaction in its private distributed ledger and subsequently notify one or both financial institutions 756, 758 to record the transaction in their respective private distributed ledgers. In some embodiments, the financial institution 756 may update the holder of the equivalent fiat currency in the financial institution's omnibus account. This may update the FDIC insurance information or other suitable insurance information for protecting the new owner of the transferred digital currency.

In some embodiments, the customer of the financial institution 758 may request the digital currency of the financial institution 756, e.g., $AA100SC, be converted into fiat currency, e.g., $100, and deposited into the customer's account at the financial institution 758. The clearing house 760 may act as an intermediary between the two financial institutions in order to facilitate the transaction. The clearing house 760 may verify for the financial institution 756 that the digital currency is held by the customer and notify the financial institution 756 (that issued the digital currency) regarding the transaction. In some embodiments, the digital currency for the financial institution 756, e.g., $AA100SC, may be exchanged directly into the requested fiat currency, e.g., $100. In some embodiments, the digital currency for the financial institution 756, e.g., $AA100SC, may first be converted to equivalent digital currency for the financial institution 758, e.g., $BB100SC, and subsequently exchanged into the requested fiat currency, e.g., $100.

In some embodiments, the clearing house 760 may generally act as a gateway for financial institutions, such as the financial institution 758, to track balances of the digital currency issued by the financial institution 756 that are held by customers of the respective financial institutions. In some embodiments, the clearing house 760 may apply a tiered or ranking system for determining appropriate timing for completing the transaction (e.g., Tier 1-Tier 5). The clearing house 760 may incorporate a tiered structure for ranking financial institutions based on asset size, debt rating, financial solvency tests and/or other suitable criteria for each financial institution. For example, financial institutions in the highest tier, e.g., Tier 1, may settle all transactions between them once a month or when a certain limit is reached. In another example, a financial institution in the highest tier, e.g., Tier 1, entering a transaction with a financial institution in the lowest tier, e.g., Tier 5, may require the lowest tier financial institution to immediately complete the transaction and transfer the fiat currency backing the digital currency. In another example, the clearing house 760 may request immediate payment of fees for facilitating transactions involving a lower tier financial institution, while the clearing house 760 may extend credit and collect fees on a periodic basis for facilitating transactions involving a higher tier financial institution.

Conventionally, fiat currency transfers between financial institutions may be conducted using the Clearing House Interbank Payments System (CHIPS) or Fedwire. CHIPS is a United States private clearing house for large-value transactions. Fedwire is a real-time gross settlement funds transfer system operated by the United States Federal Reserve Banks that allows financial institutions to electronically transfer funds between its participants. While CHIPS and Fedwire differ in their speed and minimum transaction amounts, both systems directly handle fiat currency and send fiat currency payments from one party to another. However, the only currency the clearing house 760 handles is relating to the clearing house's fees for facilitating transactions between the financial institutions. Unlike the conventional CHIPS-type or Fedwire-type systems, the clearing house 760 does not hold or handle any digital or fiat currency while facilitating transactions between the financial institutions. The clearing house as described may provide greater efficiency among the financial institutions, as compared to the conventional systems, in order to limit third party interactions, thereby saving time and money.

Example Computer Architecture

Figure 8:
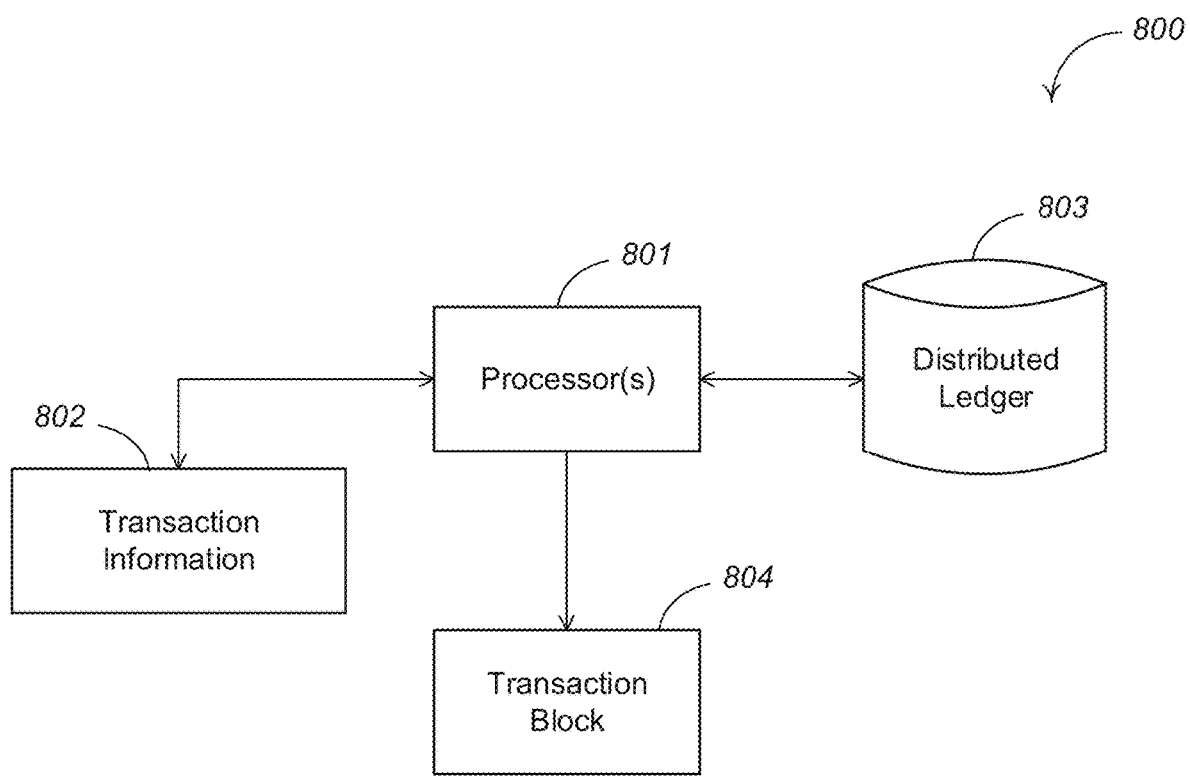
FIG. 8 shows an example implementation of a computing node for a private distributed ledger in accordance with some embodiments of the technology described herein.

One example implementation of the described systems and methods is shown in FIG. 8. In particular, FIG. 8 shows an example implementation of a computing node for a private distributed ledger in accordance with some embodiments of the technology described herein. In particular, system 800 may include one or more processors 801 that are operable to generate a transaction block for a new financial transaction (e.g., element 804). Such information may be stored within memory or persisted to storage media. In some embodiments, processors 801 may receive transaction information 802 including one or more entities involved in the transaction, an amount for the transaction, a time stamp for the transaction, and other suitable transaction information. In some embodiments, processors 801 may receive and/or generate one or more transactions blocks from the private distributed ledger 803 for each new financial transaction executed according to at least some of the described systems and methods. Processors 801 may be configured to execute at least some of the described systems and methods to generate the transaction block 804 based on the transaction information 802 and/or the private distributed ledger 803.

Figure 9:
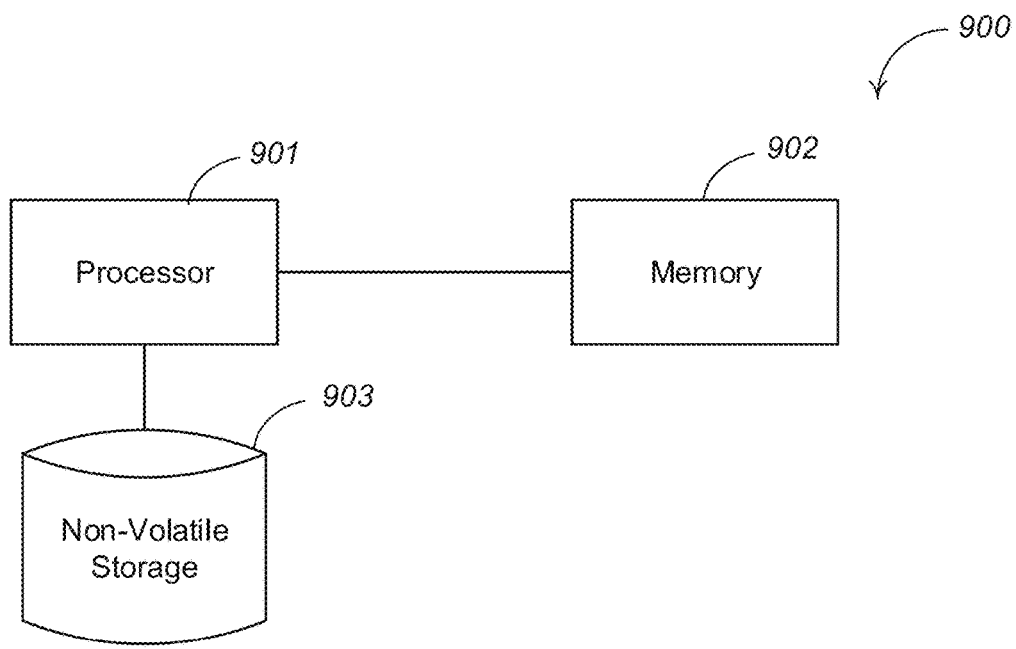
FIG. 9 shows an example computer system for executing one or more functions for a private distributed ledger in accordance with some embodiments of the technology described herein.

An illustrative implementation of a computing device 900 that may be used in connection with any of the embodiments of the disclosure provided herein is shown in FIG. 9. In particular, FIG. 9 shows an example computer system for executing one or more functions for a computing node participating in a private distributed ledger in accordance with some embodiments of the technology described herein. The computing device 900 may include one or more processors 901 and one or more articles of manufacture that comprise non-transitory computer-readable storage media (e.g., memory 902 and one or more non-volatile storage media 903). The processor 901 may control writing data to and reading data from the memory 902 and the non-volatile storage device 903 in any suitable manner. To perform any of the functionality described herein, the processor 901 may execute one or more processor-executable instructions stored in one or more non-transitory computer-readable storage media (e.g., the memory 903), which may serve as non-transitory computer-readable storage media storing processor-executable instructions for execution by the processor 901.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

All definitions, as defined and used herein, should be understood to control over dictionary definitions, and/or ordinary meanings of the defined terms.

As referred to herein, the term "in response to" may refer to initiated as a result of or caused by. In a first example, a first action being performed in response to a second action may include interstitial steps between the first action and the second action. In a second example, a first action being performed in response to a second action may not include interstitial steps between the first action and the second action.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A digital wallet for one or more digital currencies from one or more financial institutions, comprising:
    one or more pairs of public and private keys for a user holding one or more digital currencies from one or more financial institutions, including a digital currency issued by a financial institution and that is fixed with respect to a fiat currency, wherein:
    a plurality of computing nodes participate in a distributed ledger for the financial institution and/or a clearing house,
    the distributed ledger stores transaction information representing one or more transactions in the digital currency,
    at least one computing node in the plurality of computing nodes:
        stores and maintains a copy of the distributed ledger,
        receives a transaction for the user to receive from and/or send to the user or another user an amount of the digital currency, wherein at least some digital currency for the user is associated with a first omnibus account at the financial institution and at least some digital currency for the another user is associated with a second omnibus account at the financial institution or another financial institution,
        generates new transaction information representing the transaction for addition to the distributed ledger,
        transmits the new transaction information to the plurality of computing nodes,
        receives, from the plurality of computing nodes, an indication of validity of a digital signature for the user, and
        based on the indication of validity, inserts the new transaction information into the distributed ledger to complete the transaction, and one of a pair of public and private keys is used to generate the digital signature for the user to receive from and/or send to the user or the another user the digital currency issued by the financial institution corresponding to the pair of public and private keys and to record the transaction in the digital currency in the distributed ledger for the financial institution and/or the clearing house.

2. The digital wallet of claim 1, wherein no digital currency is stored in the digital wallet, and wherein the digital currency issued by the financial institution is stored and maintained in the distributed ledger for the financial institution and/or the clearing house.

3. The digital wallet of claim 1, wherein in order to use the digital currency from the digital wallet, the user authorizes use of one of the pair of public and private keys for the digital currency to digitally sign the transaction involving the digital currency.

4. The digital wallet of claim 1, wherein the digital wallet includes software in the form of an application installed locally on a computer, a mobile phone, and/or a tablet.

5. The digital wallet of claim 1, wherein the digital wallet includes a mobile wallet, a desktop wallet, and/or a hardware wallet.

6. The digital wallet of claim 5, wherein the mobile wallet, the desktop wallet, and/or the hardware wallet requires a personal identification number (PIN), a password, biometrics, facial and/or voice recognition, a fingerprint, and/or an eye scan.

7. The digital wallet of claim 1, wherein the digital wallet is connected via an application programming interface (API) to a trusted third party, and wherein the one or more pairs of public and private keys are managed by the trusted third party.

8. The digital wallet of claim 1, wherein the digital wallet includes hardware for storing the one or more pairs of public and private keys.

9. The digital wallet of claim 8, wherein the hardware includes a button that the user is required to physically press or touch in order to digitally sign the transaction.

10. The digital wallet of claim 8, wherein the hardware requires that the user provide a personal identification number (PIN), a password, biometrics, facial and/or voice recognition, a fingerprint, and/or an eye scan before the user can digitally sign the transaction.

11. The digital wallet of claim 1, wherein the digital wallet provides the user with consumer rewards, loyalty points, geo-location rewards, and/or interest for using the digital wallet.

12. The digital wallet of claim 11, wherein a reward level for the user is determined based on a balance of the digital currency maintained in the digital wallet, a total balance of digital currency issued by a plurality of financial institutions, and/or meeting one or more transaction thresholds.

13. A digital wallet for one or more digital currencies from one or more financial institutions, comprising:
one or more pairs of public and private keys for a user holding one or more digital currencies from one or more financial institutions, including a digital currency issued by a financial institution and that is fixed with respect to a fiat currency, wherein:
a plurality of computing nodes participate in a private distributed ledger for the financial institution and/or a clearing house,
the private distributed ledger stores one or more transaction blocks representing transactions in the digital currency,
each computing node in the plurality of computing nodes stores and maintains a copy of the private distributed ledger,
at least one computing node in the plurality of computing nodes:
receives a transaction for the user to receive from and/or send to the user or another user an amount of the digital currency, wherein at least some digital currency for the user is associated with a first omnibus account at the financial institution and at least some digital currency for the another user is associated with a second omnibus account at the financial institution or another financial institution,
generates a new transaction block representing the transaction for addition to the private distributed ledger,
transmits the new transaction block to the plurality of computing nodes,
receives, from the plurality of computing nodes, an indication of validity of a digital signature for the user, and
based on the indication of validity, inserts the new transaction block into the private distributed ledger to complete the transaction, and
one of a pair of public and private keys is used to generate the digital signature for the user to record, on the private distributed ledger, the transaction in the digital currency issued by the financial institution and corresponding to the pair of public and private keys.

14. The digital wallet of claim 1, wherein the digital wallet includes software in the form of an application installed locally on a computing device.

15. The digital wallet of claim 1, wherein the digital wallet is configured to provide balance information for the one or more digital currencies including:
a first digital currency fixed with respect to a first fiat currency;
a second digital currency fixed with respect to the first fiat currency; and/or
a third digital currency fixed with respect to a second fiat currency.

16. The digital wallet of claim 1, wherein the digital wallet is configured to allow converting an amount of a first digital currency issued by a first financial institution into an equivalent amount of a second digital currency issued by a second financial institution.

17. The digital wallet of claim 1, wherein the digital wallet is configured to allow converting an amount of a first digital currency that is fixed with respect to a first fiat currency into an equivalent amount of a second digital currency that is fixed with respect to a second fiat currency.

18. The digital wallet of claim 1, wherein the digital wallet is configured to authenticate an identity of the user.

19. The digital wallet of claim 1, wherein the digital wallet includes an indication of a credit worthiness of the user.

20. The digital wallet of claim 1, wherein the digital wallet is configured to receive and/or send the digital currency using a wireless communications protocol.

21. The digital wallet of claim 20, wherein the wireless communications protocol includes a near-field communication (NFC) protocol.

22. The digital wallet of claim 1, wherein the digital wallet is configured to allow converting an amount of the fiat currency into an equivalent amount of the digital currency.

23. The digital wallet of claim 22, wherein the conversion is triggered based on a balance of the digital currency and/or an amount of time since a previous conversion.

24. The digital wallet of claim 1, wherein the digital wallet is configured to allow converting an amount of the digital currency into an equivalent amount of the fiat currency.

25. The digital wallet of claim 24, wherein the conversion is triggered based on a balance of the digital currency, a tier of the financial institution issuing the digital currency, and/or an indication whether the digital currency is insured.

26. The digital wallet of claim 1, wherein the digital wallet includes an indication of a country that is insuring the financial institution relating to the digital currency in the digital wallet.

27. The digital wallet of claim 26, wherein the digital wallet includes a color and/or a code indication regarding the country that is insuring the financial institution relating to the digital currency in the digital wallet or that the financial institution is not insured relating to the digital currency in the digital wallet.

28. The digital wallet of claim 1, wherein the digital wallet is configured to provide the user with points, hotel stays, miles, coupons, and/or cash back rewards.

\* \* \* \* \*